(12) United States Patent
Mass et al.

(10) Patent No.: US 7,625,332 B2
(45) Date of Patent: Dec. 1, 2009

(54) NETTING MATERIAL WITH BREATHABLE MATERIAL PANELS AND METHOD OF WRAPPING WITH NETTING MATERIAL

(75) Inventors: Nissim Mass, Mishmar Ha'Emek (IL); Tsafrir Lior, Mishmar Ha'Emek (IL); Hagai Paz, Mishmar Ha'Emek (IL); Yuval Lieber, Kibbutz Galed (IL); Zvi Paz, Mishmar Ha'Emek (IL)

(73) Assignee: Tama Plastic Industry (IL)

( * ) Notice: Subject to any disclaimer, the term of this patent is extended or adjusted under 35 U.S.C. 154(b) by 0 days.

(21) Appl. No.: 10/517,172

(22) PCT Filed: Oct. 22, 2004

(86) PCT No.: PCT/IB2004/003475

§ 371 (c)(1), (2), (4) Date: May 1, 2007

(87) PCT Pub. No.: WO2006/043127

PCT Pub. Date: Apr. 27, 2006

(65) Prior Publication Data

US 2008/0134645 A1 Jun. 12, 2008

(51) Int. Cl.
*B32B 7/04* (2006.01)

(52) U.S. Cl. .................. 493/380; 493/383; 53/582; 53/204; 428/56

(58) Field of Classification Search .......... 493/269, 493/294, 297, 302, 379–380, 383; 53/397, 53/409, 582, 587–589, 204; 428/56
See application file for complete search history.

(56) References Cited

U.S. PATENT DOCUMENTS

| 4,703,605 | A | | 11/1987 | Ackermann |
| 4,917,008 | A | * | 4/1990 | van den Wildenberg ........ 100/5 |
| 4,929,303 | A | * | 5/1990 | Sheth ........................ 156/209 |
| 5,623,812 | A | * | 4/1997 | Todt ............................. 53/442 |
| 7,093,406 | B2 | * | 8/2006 | Anstey et al. ................. 53/397 |
| 7,093,407 | B2 | * | 8/2006 | Anstey et al. ................. 53/397 |
| 2004/0121108 | A1 | | 6/2004 | Mass et al. |

FOREIGN PATENT DOCUMENTS

| DE | 3525294 A1 | 1/1987 |
| DE | 198 33 554 A1 | 1/1999 |
| EP | 0 233 471 | 1/1987 |
| EP | 1 321 028 A1 | 6/2003 |
| EP | 1 369 516 A1 | 12/2003 |
| GB | 2 348 633 | 10/2000 |
| WO | WO 90/08702 | 8/1990 |

* cited by examiner

*Primary Examiner*—Christopher Harmon
(74) *Attorney, Agent, or Firm*—Lerner, David, Littenberg, Krumholz & Mentlik, LLP

(57) ABSTRACT

A composite netting is used for wrapping bales with a baling machine. The composite netting includes a continuous netting component, and a discontinuous, breathable material component. The breathable material component is partially attached to the netting material. In some embodiments, the breathable material is attached only along the leading edge of each breathable material panel. As a result of the attaching technique the stretching properties of the netting are not transferred to the breathable material. Thus, each component of the netting retains its individual properties. Each bale is initially wrapped with about one wrapping of netting material, followed by about one wrapping of breathable material and a partially attached net that is continuous from the first section. After this, one or more additional netting layers may be applied if desired.

25 Claims, 26 Drawing Sheets

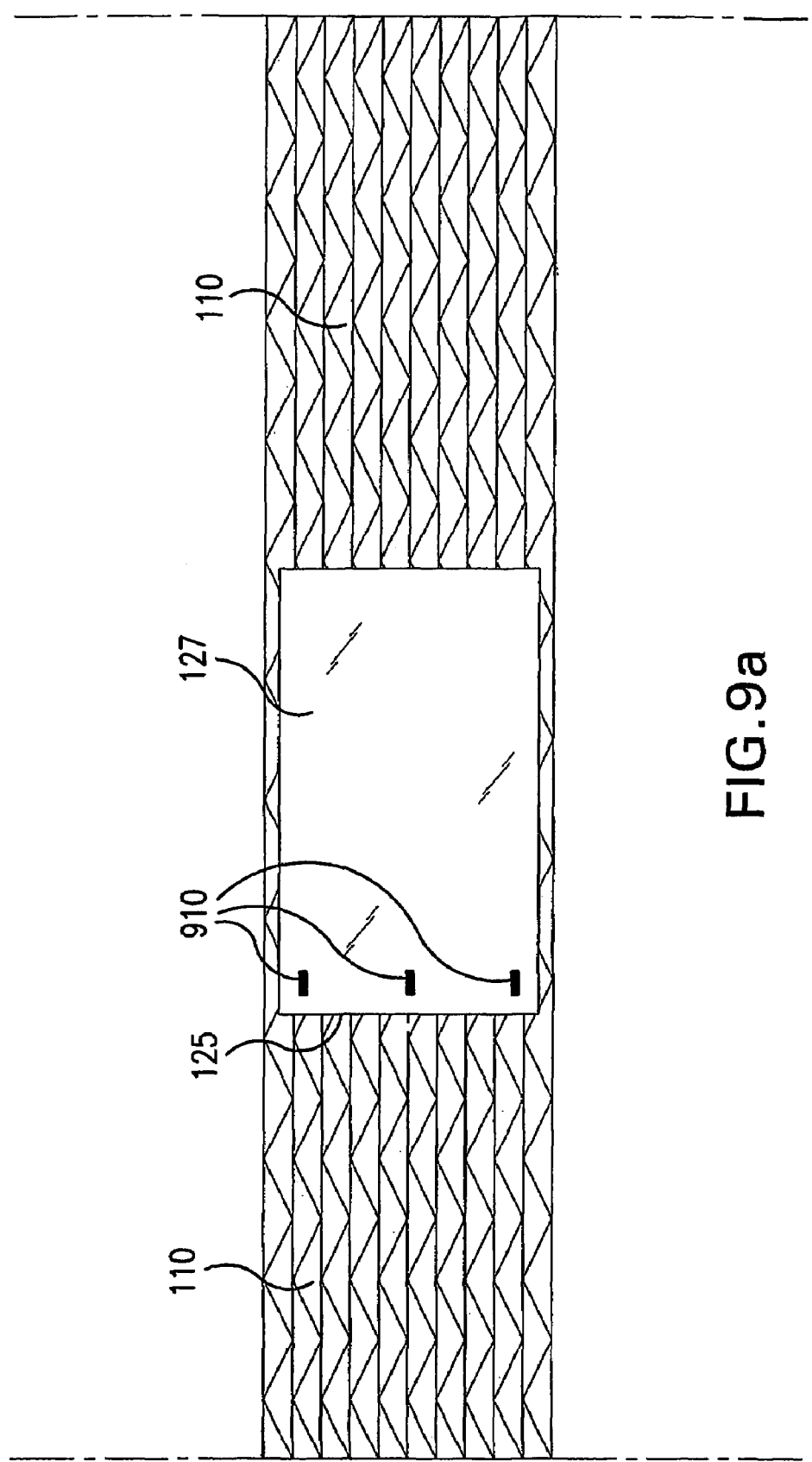

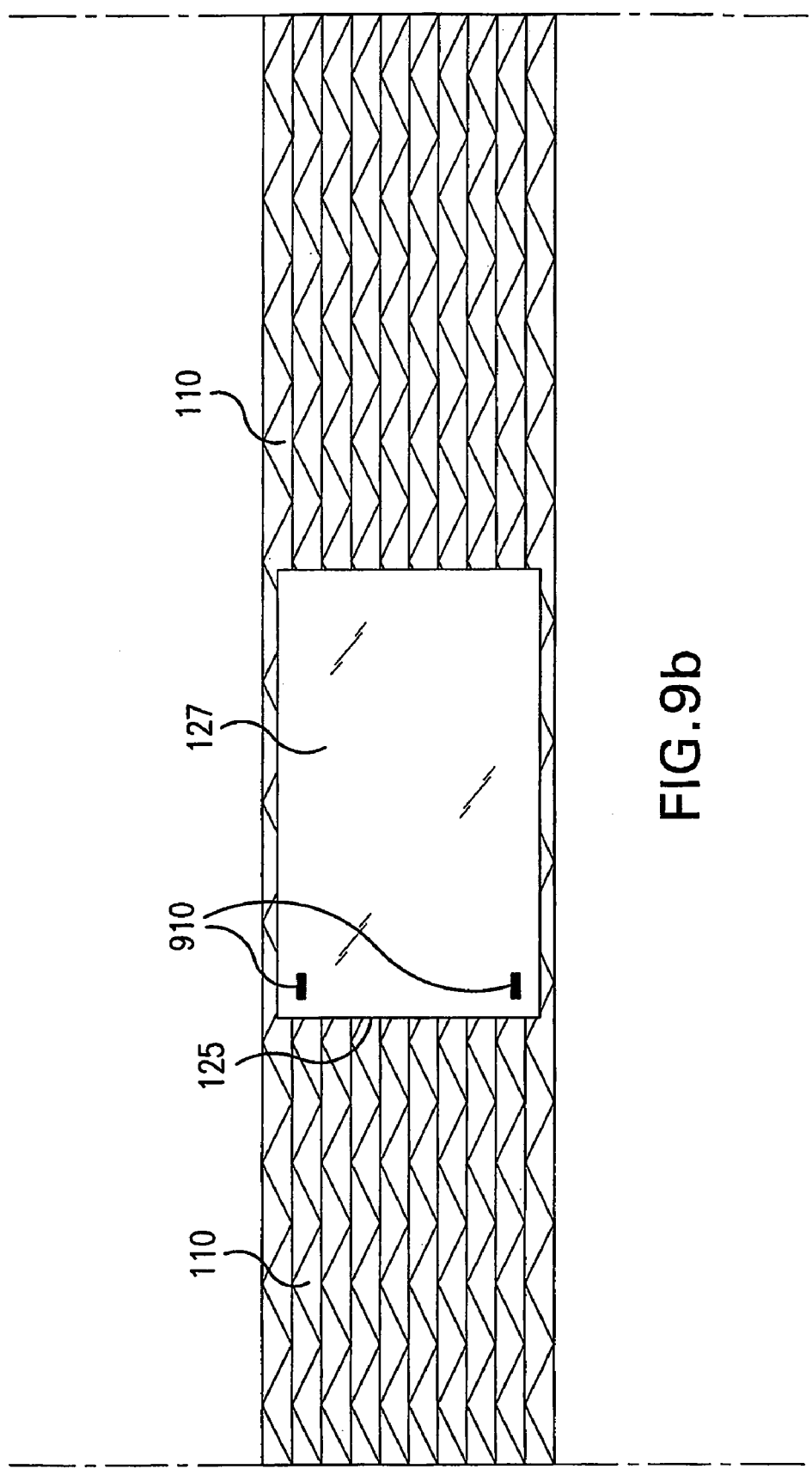

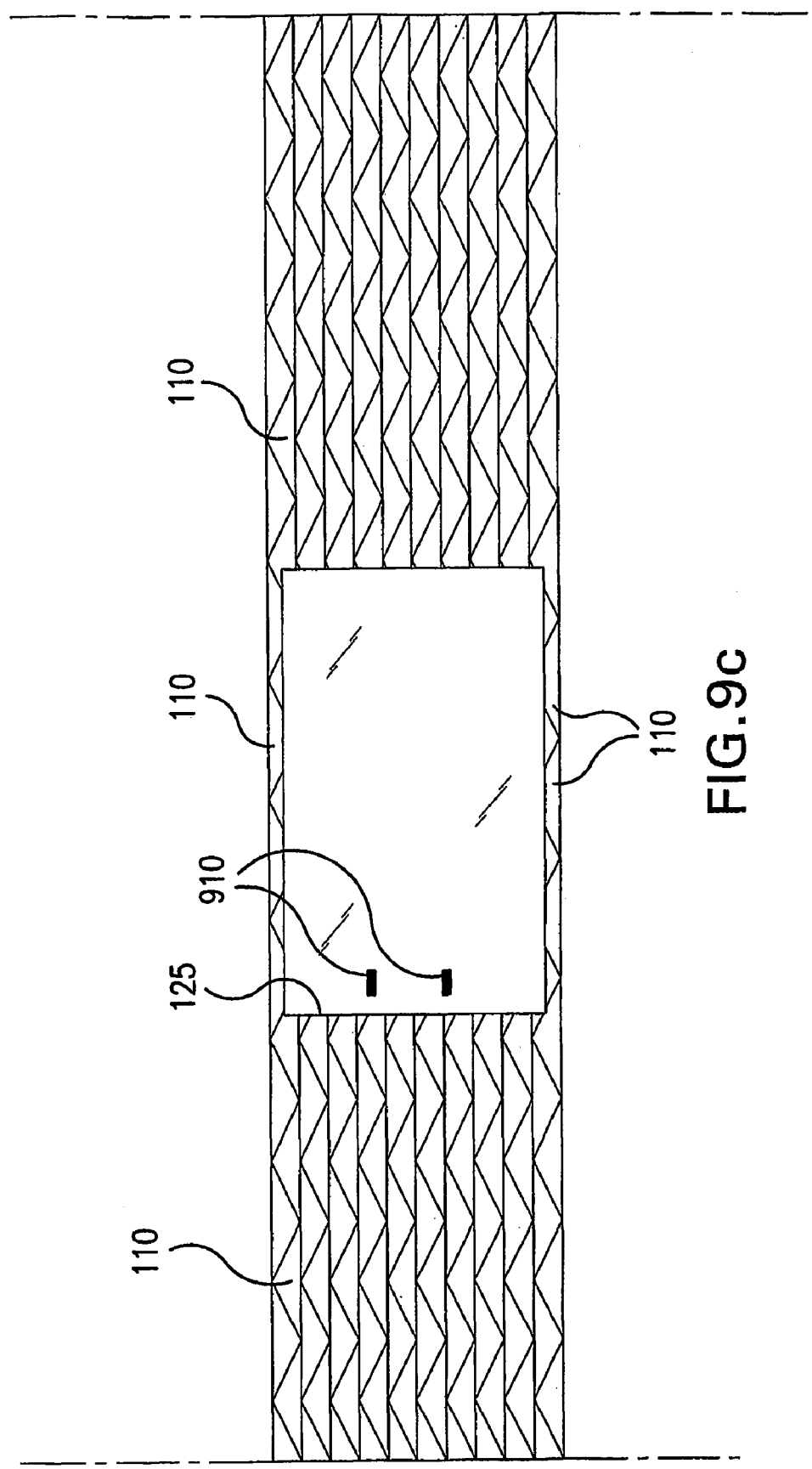

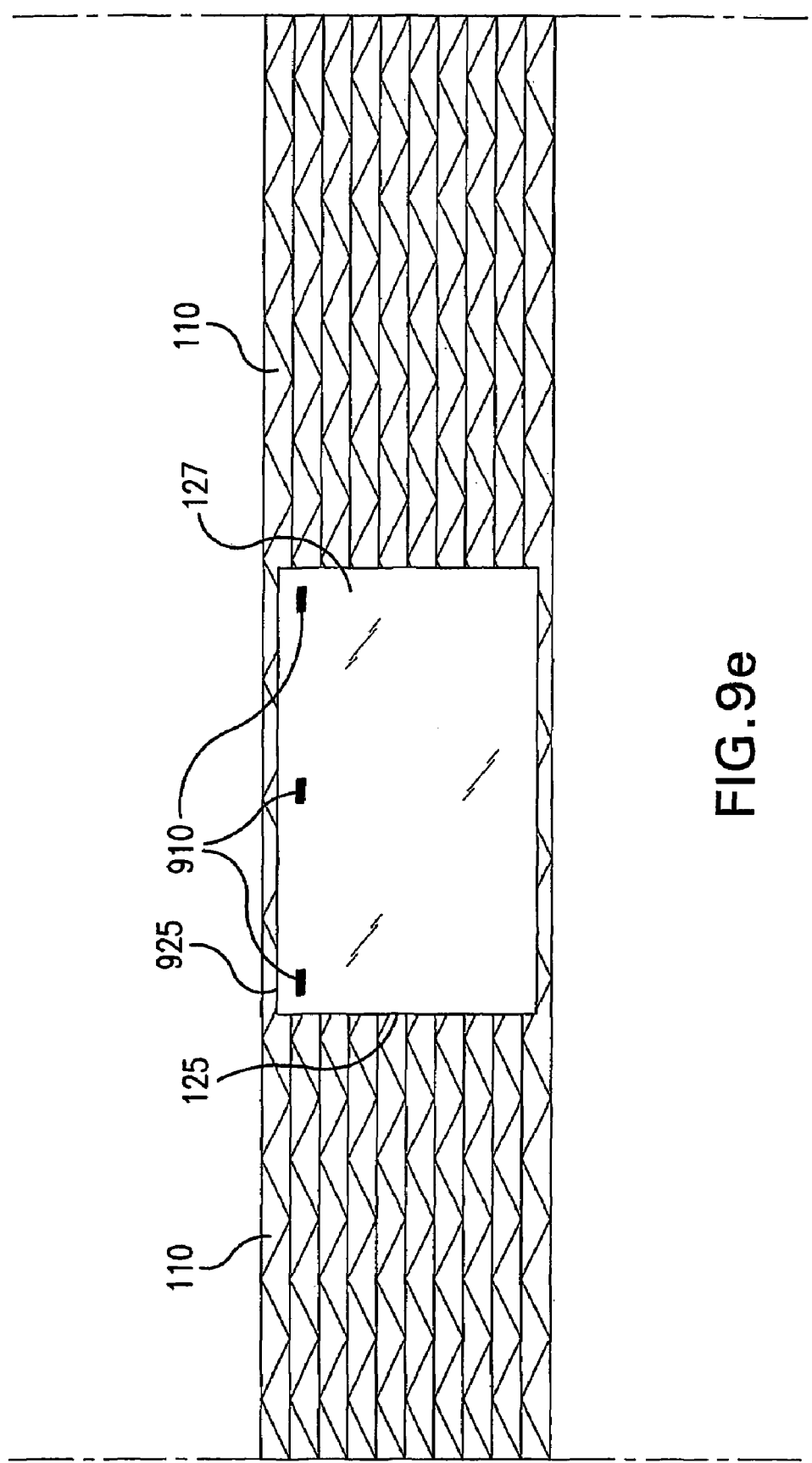

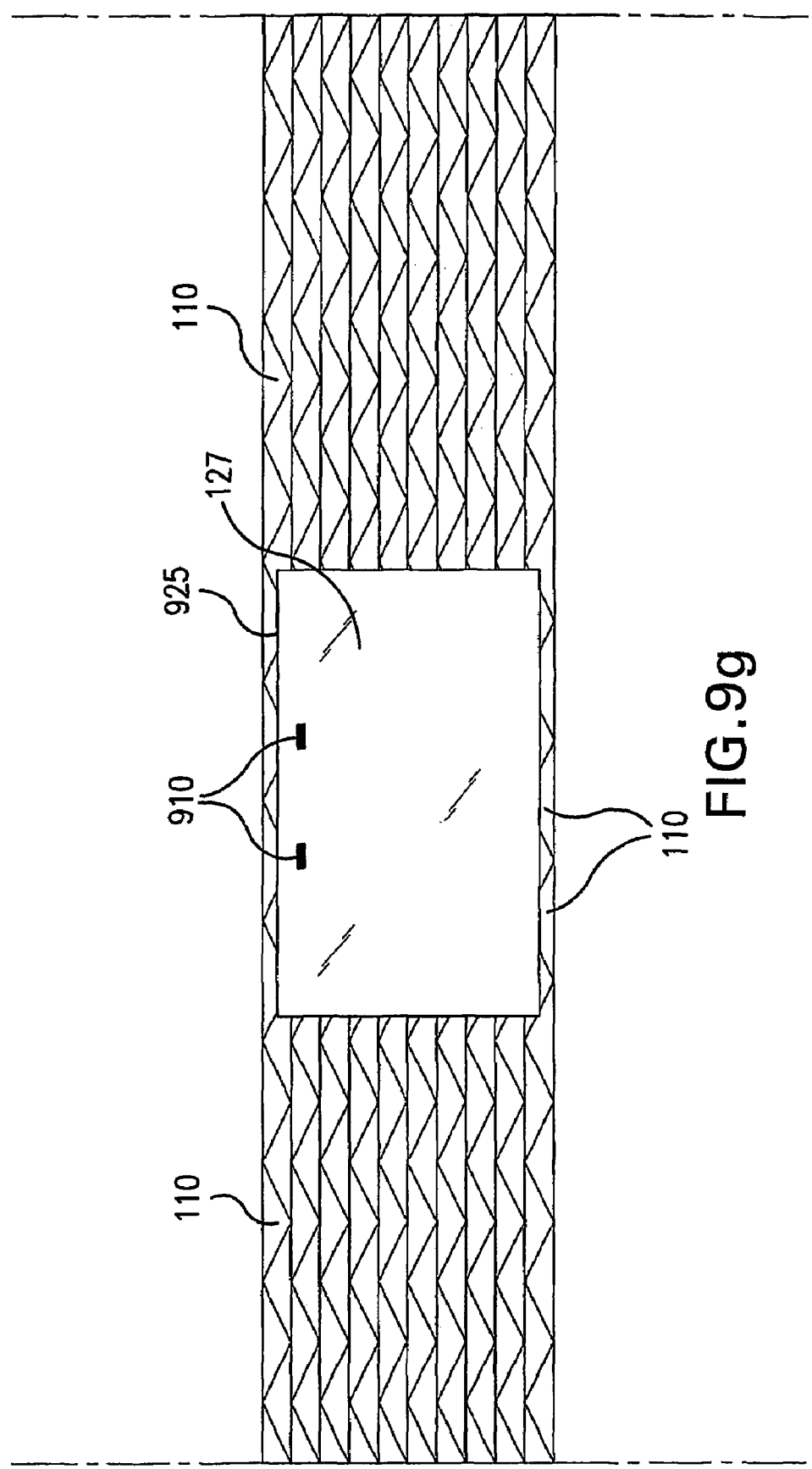

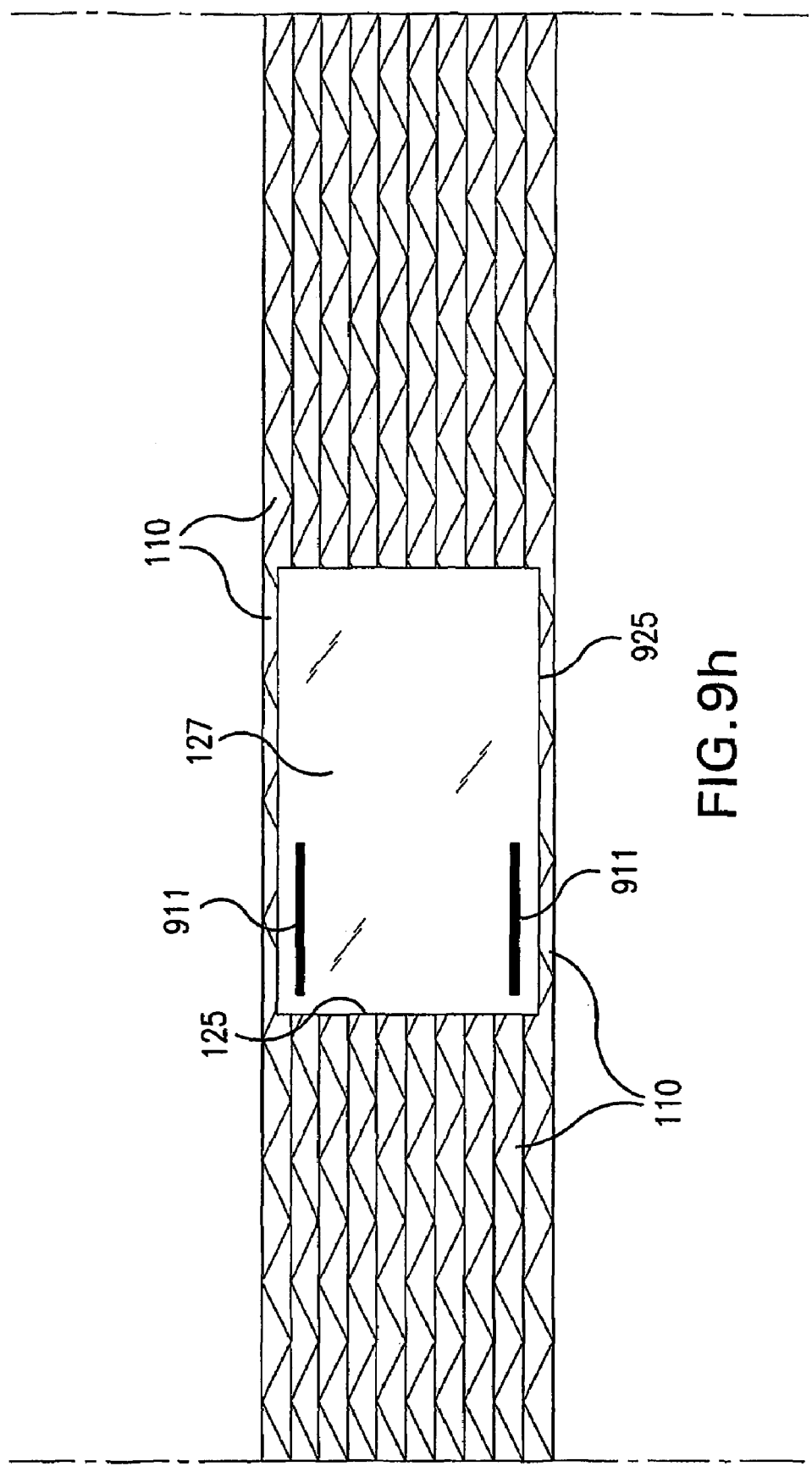

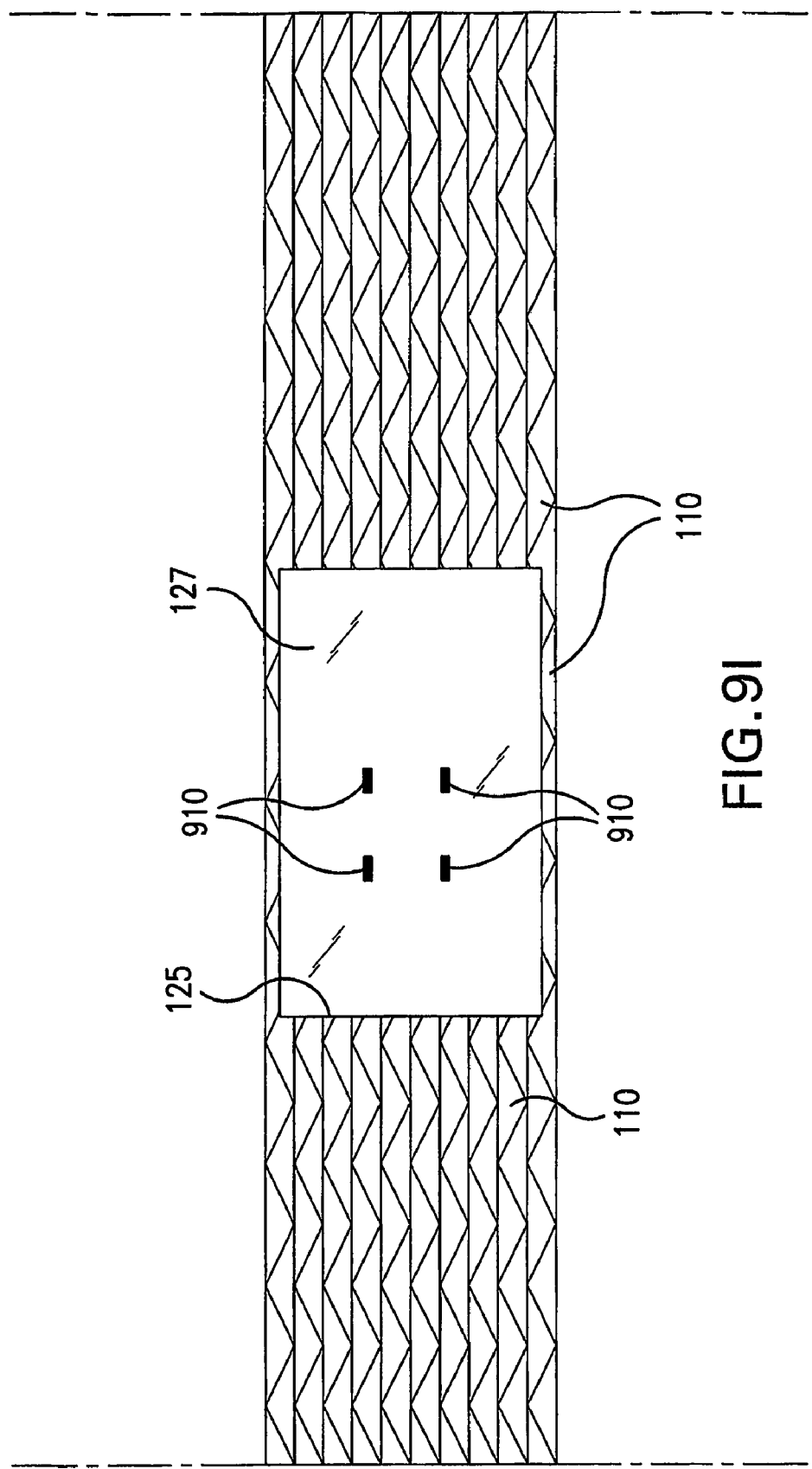

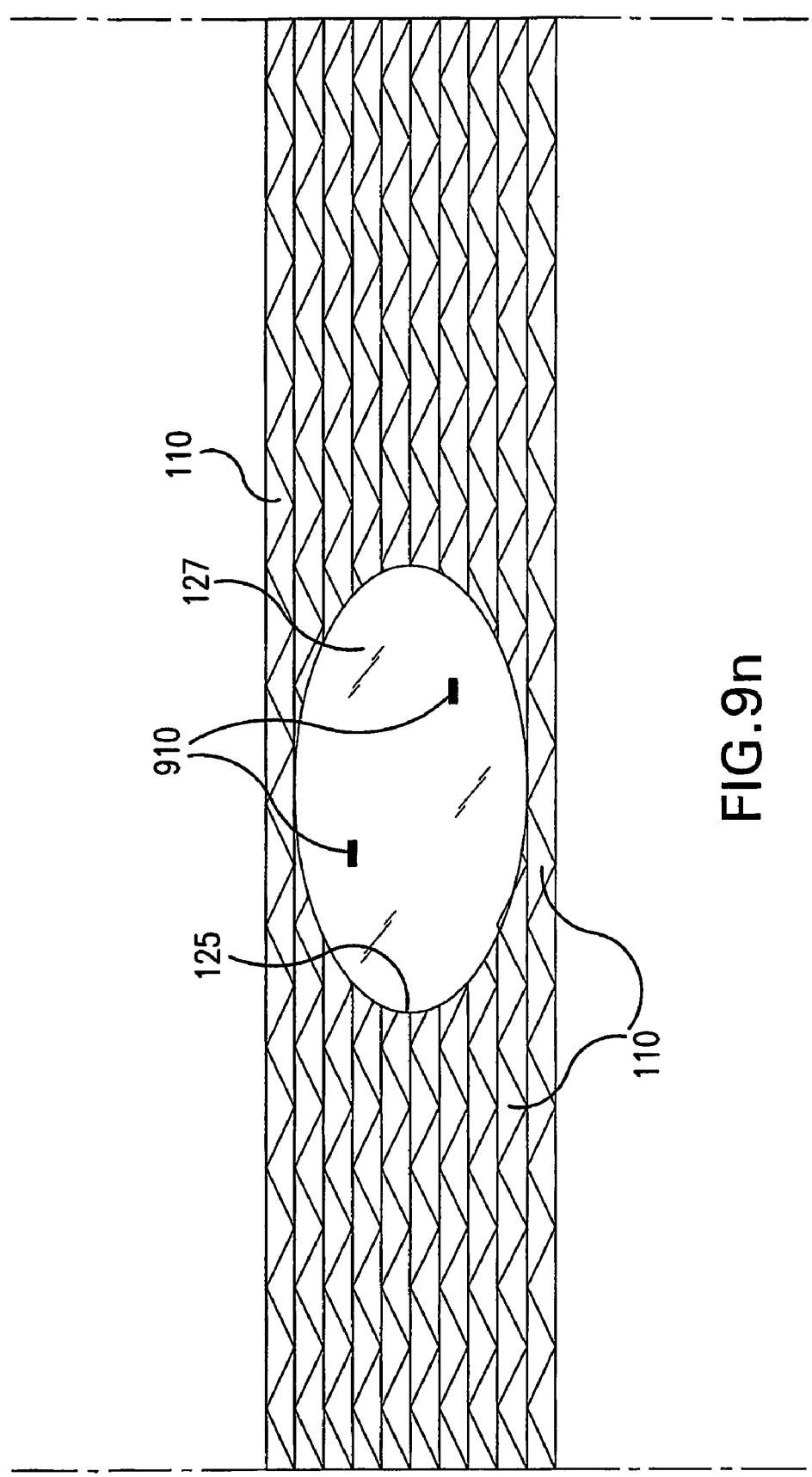

NETTING MATERIAL WITH BREATHABLE MATERIAL PANELS AND METHOD OF WRAPPING WITH NETTING MATERIAL

BACKGROUND OF THE INVENTION

1. Field of the Invention

The present invention relates to the field of netting for wrapping spoilable (perishable) items and a method of substantially reducing spoilage of the spoilable items by wrapping the spoilable items with the netting, and more particularly, by wrapping bales using a baling apparatus with the netting.

2. Description of the Related Art

The use of balers for baling agricultural crops into "round" bales (referring to a generally cylindrically shaped bale having a generally round cross-section) has become increasingly common in recent years, replacing the old system of baling square bales that were secured by different types of twine or metal wire. The first round-balers also used various types of twines to secure the bale, however, over the years different types of netting have been used. The use of netting, and in particular, knitted Raschel netting, has become more and more common. Raschel netting is a knitted netting that typically is made from polymeric material and includes a plurality of equally spaced longitudinal ribbons known as "franzes" and a plurality of intervening zigzag ribbons known as "schusses." However, the netting used, including Raschel knitted netting, is primarily open, with the franzes and schusses only making up a small percentage of the surface area of the bale and does not protect the bales from rain.

Plastic film wrap, including "sticky film" wrap has been used to wrap whole bales or portions of bales, with the goal of protecting a bale from rain.

However, the use of impermeable plastic film wrap does not allow moisture already within a baled crop to escape therefrom, since it is bound by an impermeable plastic layer. Since the inherent moisture level in baled crops may be on the order of one or more dozen percent of weight of the crop (for example, in baled hay), this bound-in humidity easily promotes spoilage of the baled crop.

Moreover, when such plastic film has been used in existing netting systems, typically only a portion of the bale was covered, leaving part of the circumference unwrapped and exposed to rain and/or to moisture from the ground on which the bale is resting. If the entire bale was wrapped with plastic film, then internal moisture could not escape. Likewise, any excess moisture gained by the crop from exposure to weather also promoted spoilage of the baled crop. Since bales are often left in a field, exposed to weather for a year or more, cumulative rain and/or ground moisture penetration may be significant, as may be the resultant crop spoilage.

Another disadvantage of using plastic film as a bale wrap has been that the film does not, itself, grasp onto a bale or underlying film layer, and thus a "sticky" portion had to be incorporated to prevent unraveling of the bale. However, use of such sticky film, even if only a small amount, was difficult to feed into a baler. Reasons for this include that, in the process of loading the film and wrapping a bale, the sticky film stuck to elements of the machine as well, making use of these materials difficult. In order to solve the problem of sticky film sticking to a baling apparatus itself, significant alterations to the baling apparatus had to have been made, often proving not to be cost-effective.

U.S. Pat. No. 4,703,605 to Ackerman describes a bale and baling process using a netting material with water impermeable portion(s) formed from water impermeable foil. In Ackerman, the net and water impermeable portions are not attached to one another, but are fed from either separate rolls, or alternatively are a single piece of material, in which holes are created to form a netting in certain areas, leaving other areas completely sealed off to protect the bale from moisture. Ackerman only covers the bale partially with the water impermeable portion. In Ackerman, only the top, or the top and bottom are covered with such plastic.

German Patent No. DE 3525294 (DE '294) describes a wrapping material for bales having a "watertight film" arranged in a central portion of a netting material. The watertight film has a length equal to at least half the circumference of the bale. No indication is given that it should be anything substantially more than about ½ the circumference of the bale. This watertight film is welded or glued to the net "point by point." In addition, in DE '294, the netting and the film are fully attached, thus the stretching characteristics of the net are transferred to the watertight film. DE '294 only covers about ½ the circumference of a bale, leaving the remainder of the bale exposed to the elements.

German Patent No. DE 19833554 (DE '554) describes a pre-shaped bale cover for a pre-determined size of bale made up of segments of fiberglass netting attached end-to-end with plastic "foil" segments (note brackets 12 and 14). This end-to-end attachment of segments is significant because the tensile strength of the cover in DE '554 is limited to the weakest portion, which is likely to be the foil segments.

European Patent No. EP 1321028 (EP '028) describes a baler and an enveloping apparatus. Separate rolls of net and sticky (stretch) film, which adheres to underlying net layers, are used. Thus, the layers are not attached to one another prior to assembly.

Published U.S. Patent Application 2004/0121108 (US '108) describes a material and method for wrapping objects with multiple materials in which sequential alternating netting and film segments are used. The netting is not continuous throughout the material, which, like DE '554, prevents the tensile strength of the netting to be of real benefit.

Published PCT Application WO 90/08708 describes a packaging material having breathable paper strip portions and a transparent window strip portion for forming packaging simultaneously with the insertion of a product into the packaging. The strips of the packaging material of WO 90/08708 are arranged side-by-side, attached along adjacent edges, each strip being continuous from the beginning of a roll, to the end of the roll of the material.

Great Britain Patent No. GB 2348633 (GB '633) describes a laminated material in which film is laminated to a netting material. The net offers relatively greater strength than the film portion, but moisture cannot pass through the film portion, and attachment of an end portion of the netting to the bale, to prevent unraveling of the wrapping is difficult. Because of the lamination of the two layers in this reference, negative synergy exists between the netting portion and the film portion. Such negative synergy is a result of, for example, introducing a relatively stretchable component (the film), with a comparatively less-stretchable component (netting).

Typical stretch films for the purposes of wrapping bales experience a reduction in width in connection with an increase in length (stretch). For example a 76 cm wide film used for silage wrapping loses 32% of its width when lengthening 77%. Even if a laminated material has one component with less drastic properties, the laminate as a whole disadvantageously experiences the shape changes of the material with larger shrinkage ratios.

SUMMARY OF THE INVENTION

The subject composite netting includes a continuous netting component, and a discontinuous, (e.g., panels, segmented or intermittent) breathable material component. The breathable material component is partially attached, or tacked, to the net. The breathable material is defined as a material that is substantially vapor permeable, and substantially liquid impermeable, particularly with regard to water vapor and liquid water. In some embodiments, the breathable material is attached only along the leading edge of each breathable material panel. As a result of the attaching technique the stretching forces to which the netting is subjected are not transferred to the breathable material. Thus, each component of the netting retains its individual properties. Each breathable material panel is aligned with and proximate to or contiguous with a portion of the netting, and is of sufficient width to extend across the width of a bale, and of sufficient length to circumscribe the bale circumference a single time, or optionally with only a slight overlap.

Each bale is initially wrapped with about one wrapping of the netting material of the composite netting. However, more or less netting is optional and not substantially detrimental to the function of the breathable material. The breathable material that is partially attached to the composite netting is then, in a continuum, wrapped around the bale with the adjacent netting section, which totals at least two netting layers and one breathable layer of material. After this, one or more additional netting layers may be applied if desired.

Finally, as an optional step, the outermost netting layers are slit along a center line of the bale, causing these portions of the netting materials to spread over and cover the edges of the bale.

The subject composite netting can be used as a single feed of composite material, which is pre-assembled, in a factory or the like, prior to mounting on a baling machine.

The breathable material is attached to the netting at preselected intervals of the netting, and only a portion of the breathable material is attached, in some embodiments, along the leading edge of the breathable material. In this sense, the term "leading" is relative to a direction of feeding into the baling apparatus. The breathable material may be attached to the netting in any of a variety of manners, including by ultrasonic welding, adhesive tape, or a hot melt or other types of connections.

By attaching the breathable material only at one edge of the breathable material, in particular at its leading edge, the elongation and lateral shrinkage experienced with the netting during the baling process (which may be as high as about 10%), does not affect the length or width of the breathable material. The netting may be Raschel knitted or another suitable netting material.

Typically, only one layer of breathable material is intended to cover the bale, so that the function of the breathable material is not impeded by excess material. Depending on the specific type of material, if more than one layer is not detrimental to the effectiveness of the breathable material, such extra layers may be used in accordance with the invention.

In one embodiment, each wrapping process will begin and end with netting, so that there will typically be three total layers of netting, one of which is adjacent to the breathable material portion.

In other embodiments, extra layers before and/or after the breathable material layer are employed. Typically, this embodiment would be used to provide increased strength for the wrapped bale.

In certain embodiments, the breathable material extends only the width of the bale, while the net extends beyond the width of the bale, in order to facilitate covering the edge of the bale, particularly when the outermost layer of netting is split. The netting is dimensioned to extend over the edges of the bale, which allows the net to grip rough edges of a baled crop and thereby reduce the chances for unraveling of the net that can otherwise more easily occur. In combination with the breathable material, the netting is not able, in many instances, to grasp parts of the bale, since the net most effectively engages with the baled crop. If the breathable material prevents the netting from contacting the baled crop, the netting cannot engage therewith to prevent unraveling. Similarly, the effectiveness of the netting grasping underlying layers of netting may be impeded by the breathable material. Thus, the edges of the bale may be the only portion of the bale with which the netting can engage. By splitting a portion of the netting, the netting can spread and even more effectively cover and grip the edges of the bale, thereby preventing unraveling of the netting.

DETAILED DESCRIPTION

Figure 1:
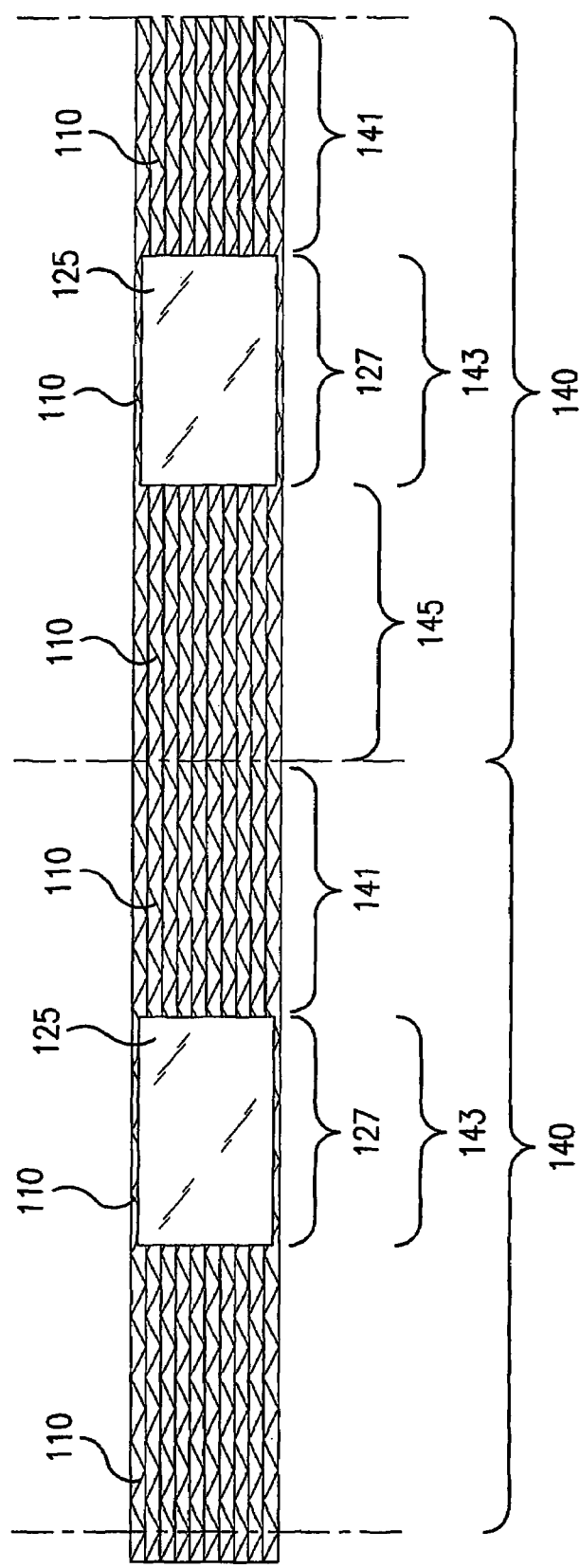
FIG. 1 is a top (face) view of a first embodiment of a composite netting material according to the present invention.
Figure 2:
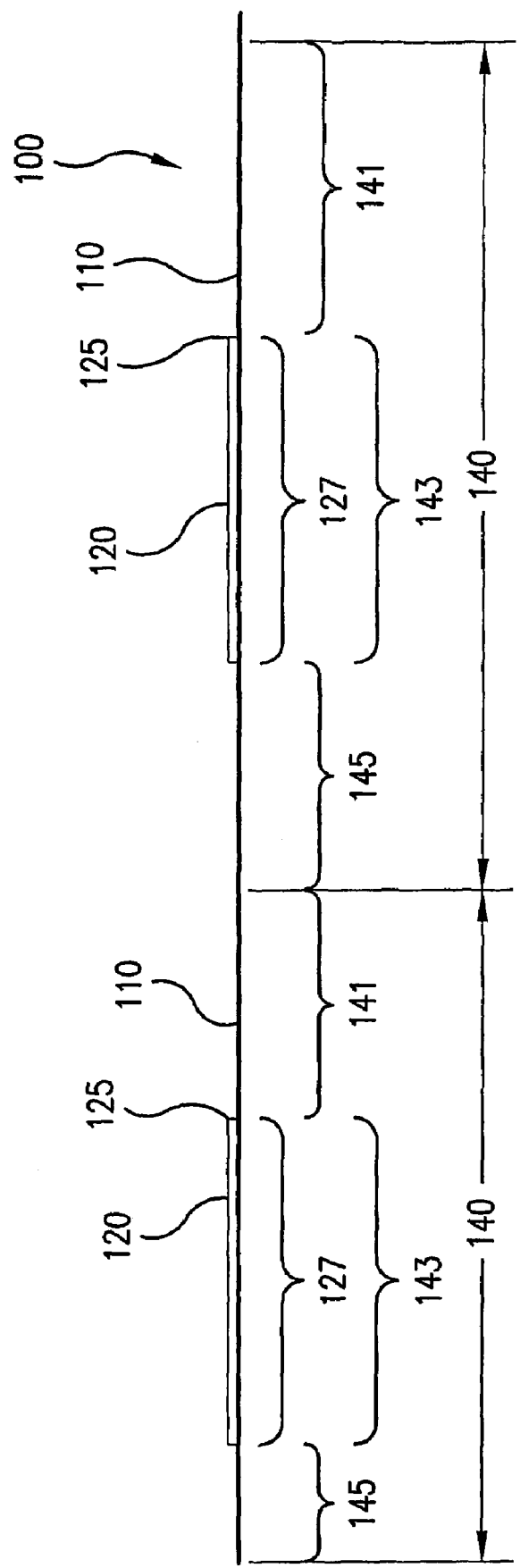
FIG. 2 is a side (edge) view of the first embodiment of the composite netting material.

As seen in FIGS. 1 and 2, the subject composite netting 100 includes a continuous netting component 110, and a discontinuous, breathable material component 120. The breathable material component 120 is separated into panels 127 and though only two panels are illustrated in FIGS. 1 and 2, it is to be understood that the netting is continuous and has a substantially repeating pattern. The breathable material panels 127 are spaced along the continuous netting material 110 at preselected intervals, which relate to a circumference of a bale to be wrapped.

In a preferred embodiment, one breathable material panel 127 wraps one bale, one time, and accordingly has a length substantially equal to the circumference of the bale to be wrapped. Typically, only one layer of breathable material 120 is intended to cover the bale, so that the function of the breathable material 120 is not impeded by excess material. Depending on the specific type of material, if more than one layer is not detrimental to the effectiveness of the breathable material, such extra layers may be used in accordance with the invention.

In some embodiments, the netting material 110 is a Raschel knitted netting, and in other embodiments, another suitable netting material is used. A suitable netting material has sufficient longitudinal strength to hold a bale together. Ideally, a suitable netting material also prevents unraveling of the netting 100 from the wrapped bale, and allows attachment of the breathable material panels 127 with minimal difficulty.

In some embodiments, the breathable material 120 is a fused polyethylene material, (e.g., Tyvek®). In other embodiments, the breathable material 120 comprises non-woven materials such as SMS (styrene/alpha-methylstyrene), spunbound materials, meltblown materials or the like. The breathable material 120 may also comprise a breathable film, microperforated film, or a multi-layer breathable sheet including any of the aforementioned materials and/or other materials.

The width of breathable material 120 is, in a preferred embodiment, substantially equal to a width of a bale to be wrapped. In other embodiments, however, the width of the breathable material may be wider or narrower than the width of a bale.

The netting material 110, may also be less than, equal to, or greater than the width of a bale to be wrapped. However, in a preferred embodiment, the netting material 110 is slightly wider than the bale to be wrapped, to facilitate the netting material 110 gripping edges of the bale. Accordingly, in a preferred embodiment, the netting material 110 is slightly wider than the breathable material portion 120.

In a preferred embodiment, the netting 100 is manufactured so as to have a plurality of wrapping portions 140, each wrapping portion being for wrapping a single bale, and having at least three sections. In a preferred embodiment, the first section 141 of each wrapping portion consists essentially of a netting 110. This first wrapping section 141 is continuous with the netting of the second wrapping section 143, which additionally has a breathable material panel 127 partially attached thereto. The third wrapping section 145, is again continuous with the netting 110 of the second wrapping section 143, and itself consists essentially of a netting 110. The length of this third wrapping section 145 may only be as long as required to secure the end of the wrapping portion 140 to the wrapped bale via the underlying layers of netting 110 and breathable material 120. Alternatively, third wrapping section 145 may be approximately the circumference of the bale, or longer, if increased strength or another result are desired. Additional wrapping sections may be added following the third wrapping section, which may include additional features. Such additional features may include indicators that allow the bale to be seen from a distance.

The subject composite netting 100 uses a single feed of composite material, which is pre-assembled, prior to mounting on a baling machine. That is, the breathable material is not on a separate roll, and separately fed into the baling machine.

The breathable material 120 is attached to the netting material 110 along the length of the netting material at preselected intervals. Only a portion of each breathable material panel (or "segment") 127 of the breathable material component is attached to the netting material 110. The breathable material panel 127 is attached to the netting material 110 so that it lays substantially contiguously with the netting material 110 when formed in a roll, during the wrapping process, and while wrapping a bale. The breathable material panels 127 and the netting material 110 are preferably in an abutting relationship throughout the length of the breathable material panel 127.

Of primary importance for the attachment between the breathable material layer (or "component") 120 and the netting material (or "component") 110, is that relative movement between the breathable material layer 120 and the netting material 110 is allowed to occur, particularly during the wrapping process. It is necessary that any movement due to elongation (stretching) and narrowing of netting 110 during the baling process is not transferred to the breathable material 120. Instead, the layers of netting 110 and breathable material 120 must be able to move past one another to some degree when dimensional changes occur, such as during a baling operation. Accordingly, any attachment that allows this to occur is likely suitable. Among these, connectors that physically restrain the breathable material panel 127 to the netting material are desired. Though physically restrained, movement is allowable, thus a "slide-able" connector, a connector having some amount of slack or stretch, or the like is applicable.

Figure 9D:
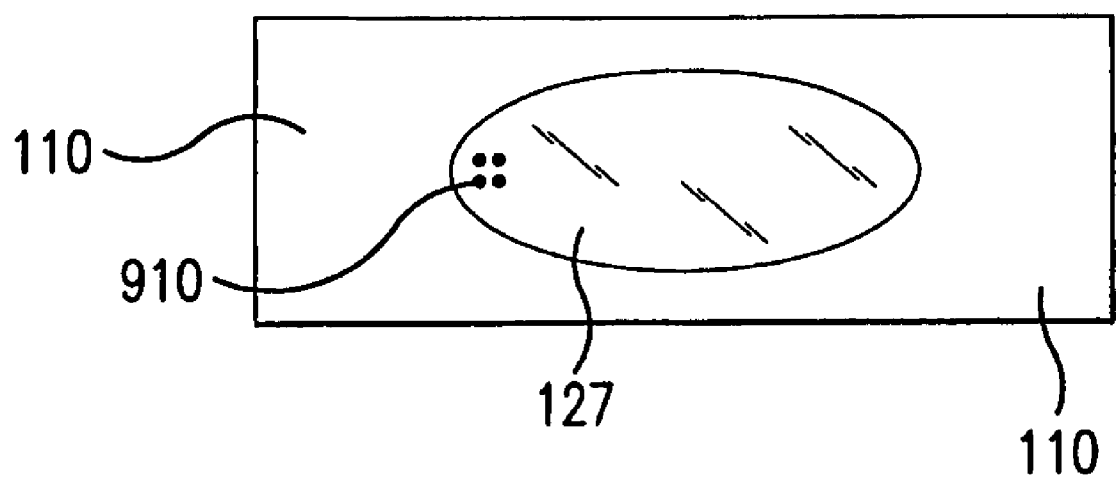
FIGS. 9A-9O illustrate example, non-exhaustive alternative embodiments for attachment point locations for attaching a breathable material panel to a netting material in accordance with the invention.
Figure 9F:
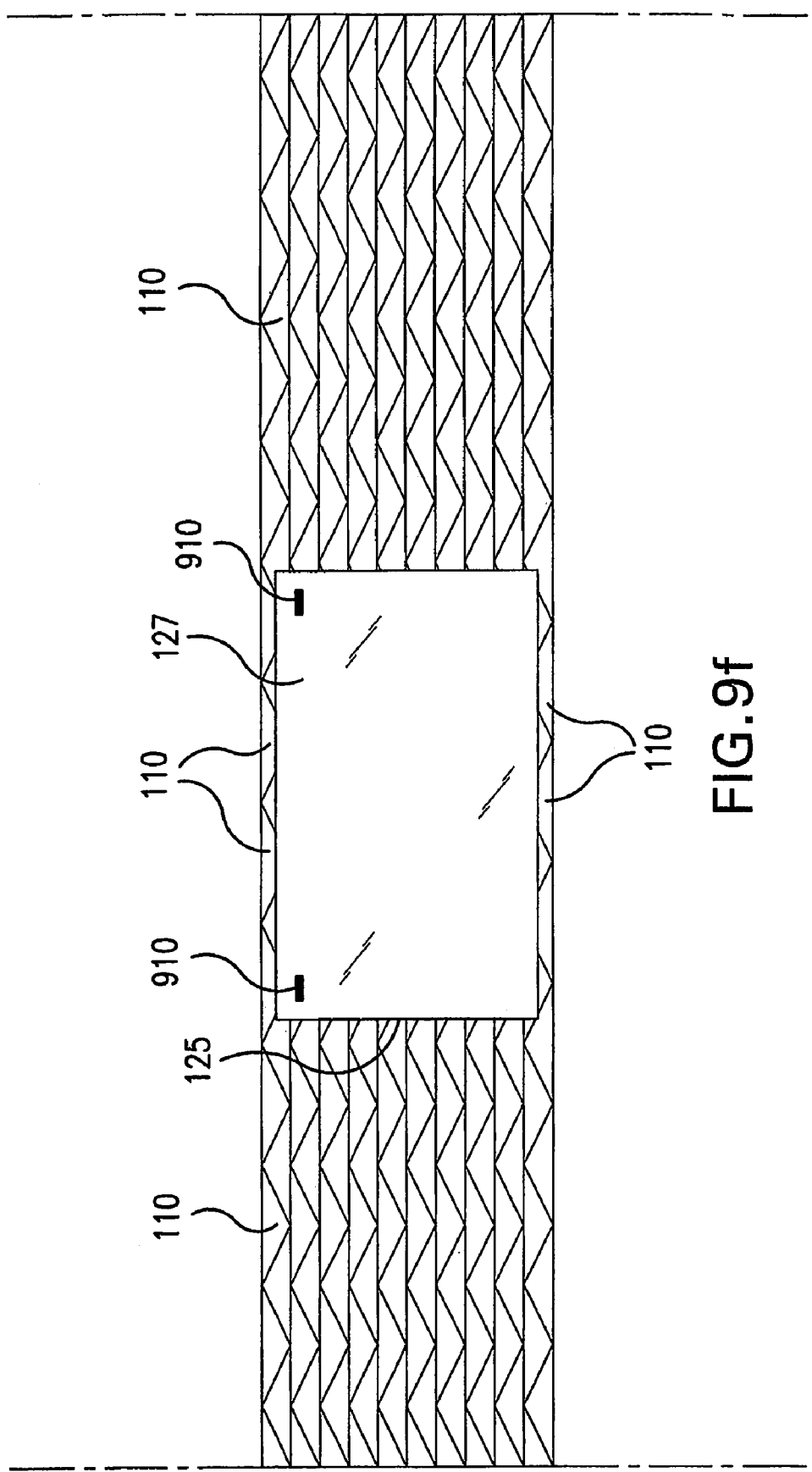
Figure 9I:
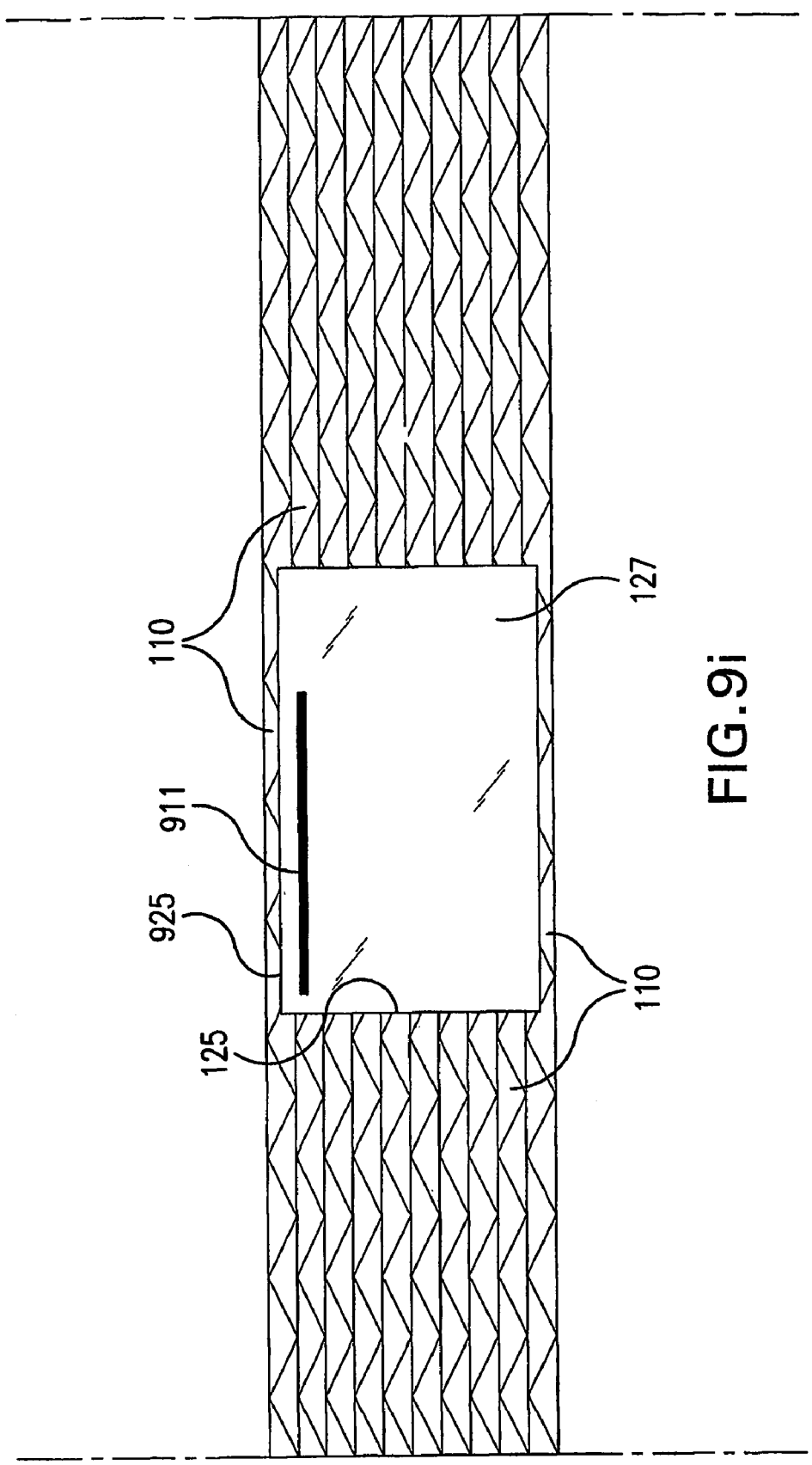
Figure 9J:
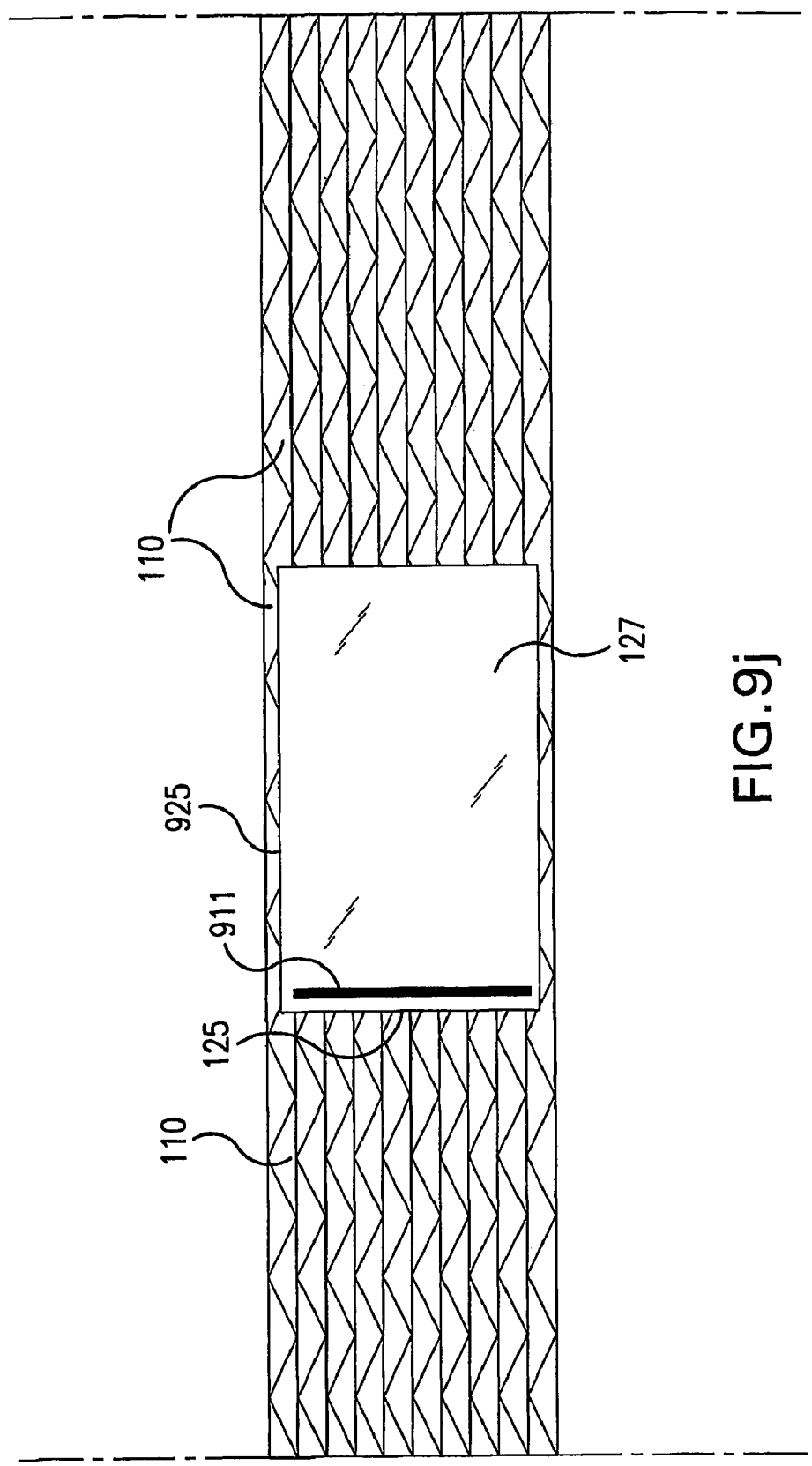
Figure 9K:
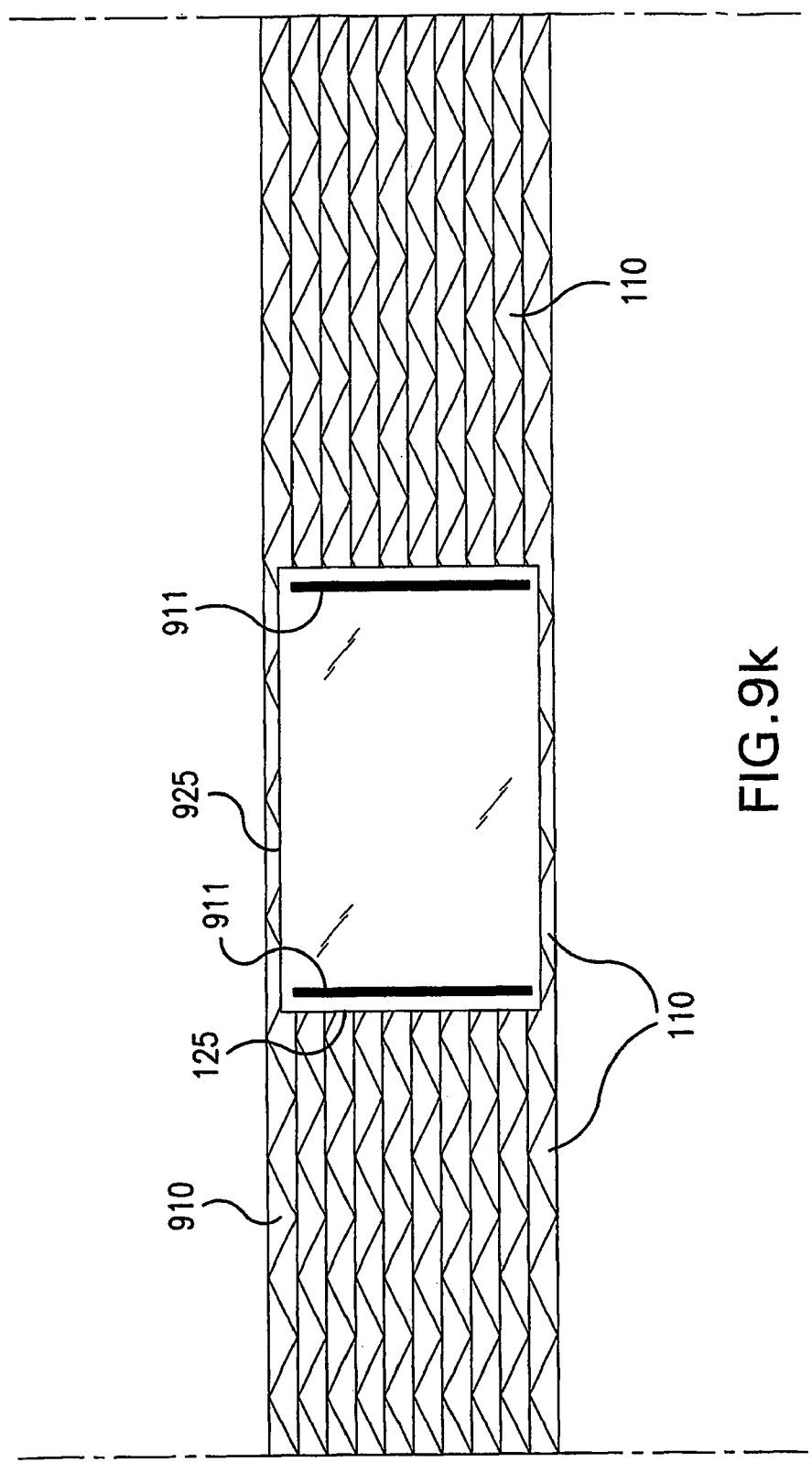
Figure 9M:
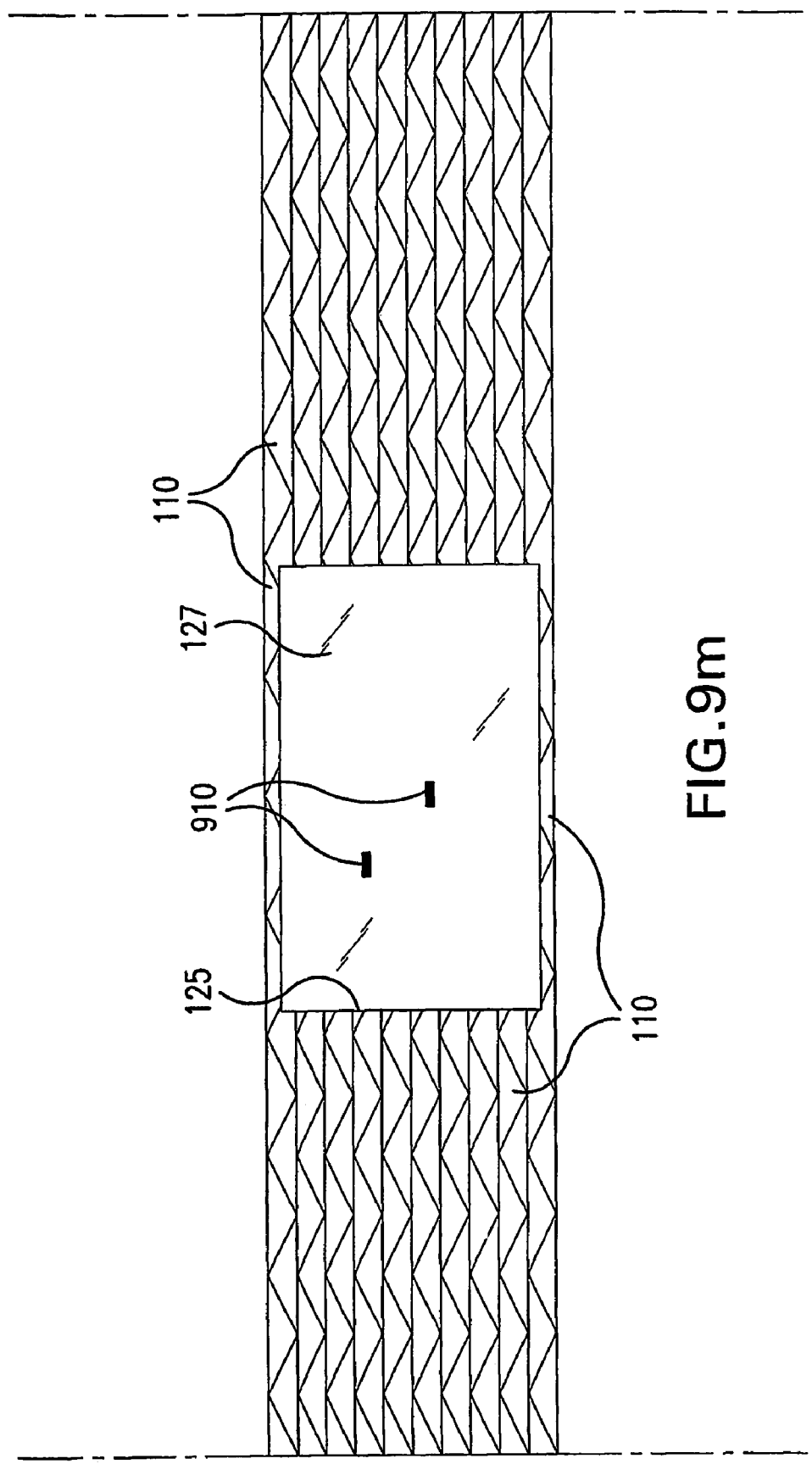
Figure 9O:
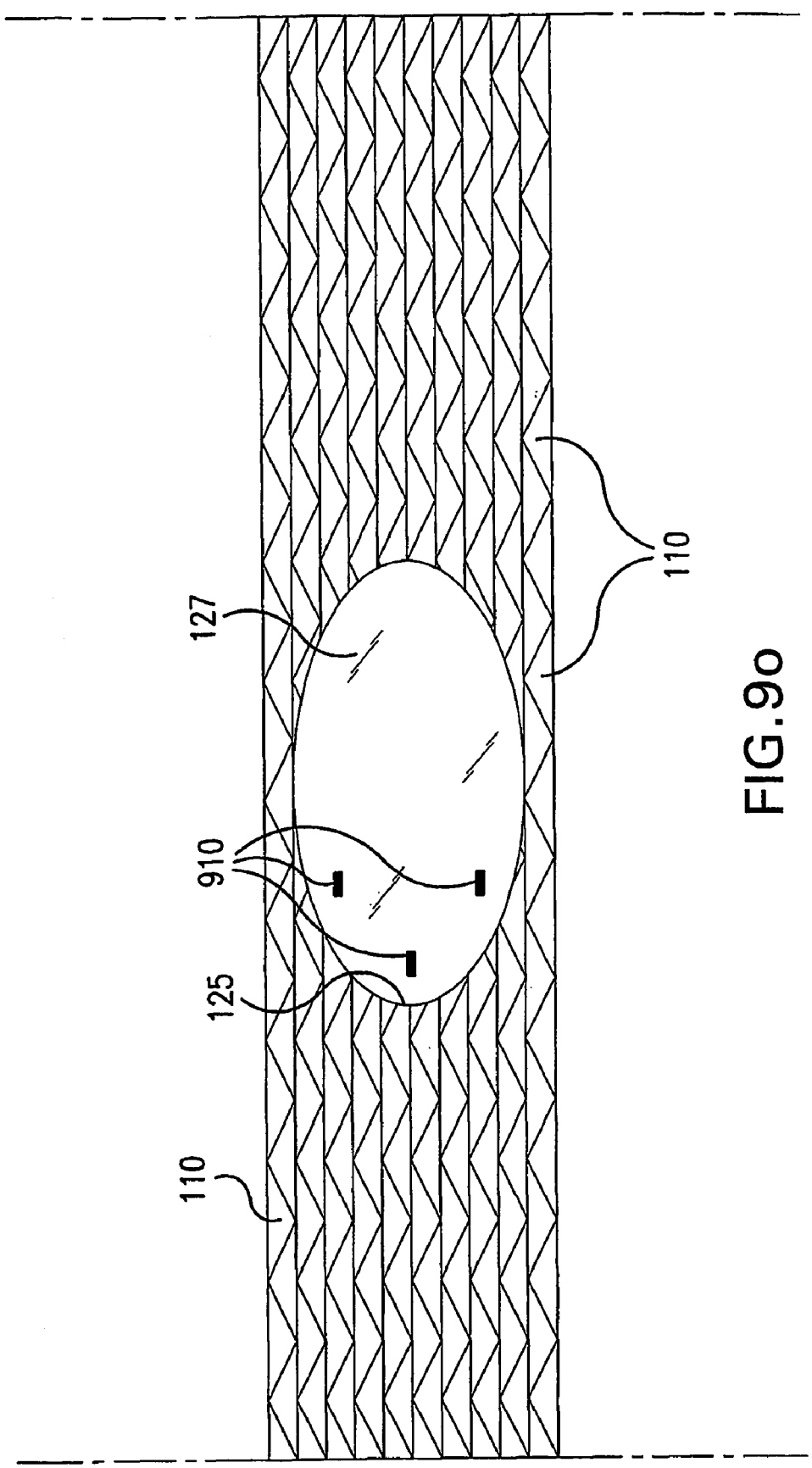

FIGS. 9A-9O illustrate various possible connection points (or attachment regions) between the breathable material panel 127 and the netting material 110. Because the breathable material 120 will typically have some degree of stiffness, attachment to the netting material 110 need not always be only along a leading edge 125 of the breathable material panel 127 (as shown in FIGS. 9A, 9B, 9C, 9D and 9J). Instead, due to this "stiffness," attachment points may be arranged at points either along a leading edge, along a side edge or edges (as shown in FIGS. 9E-9I), toward a center of a breathable material panel 127 (as shown in FIGS. 9L-9N), or any location where attachment minimally interferes with relative longitudinal and lateral stretching of the components. Preferably, substantial lateral displacement of the breathable material panel 127 relative to the netting portion is additionally avoided, as is any substantial relative rotation. Preferably, the breathable material remains within and substantially aligned with borders defined by the lateral edges of the netting material 110, except in circumstances where extension beyond these borders is desired for other reasons.

As seen in the embodiments of FIGS. 9A-9D and 9J, the breathable material panel 12 is partially attached to the netting material 110, only along, or very near the leading edge 125 of each breathable material panel 127. In this sense, the term "leading" is relative to a direction of feeding into the baling machine. FIG. 9A illustrates three attachment points 910 distributed evenly across the leading edge 125 of the breathable material panel 127. If the narrowing of the netting material 110 is not significant, then this arrangement of attachment points 910 will effectively allow movement between the components.

Multiple attachment points help prevent lateral and longitudinal shifting of the components as well as relative rotation between the components. FIG. 9B, similarly shows attachment on the leading edge, but only includes two attachment points, eliminating the center point of attachment as compared with the embodiment of FIG. 9A. FIG. 9C also illustrates attachment along the leading edge 127 of the breathable material panel 127, but in this embodiment, attachment points 910 are located proximate to each other and near a central axis of the netting material 110. Such arrangement of the attachment points provides control over the orientation by restricting longitudinal and lateral slippage of the breathable material panel 127 relative to the netting material 110, and also prevents relative rotation, since the plurality of points illustrated, more effectively prevents rotation than a single point. Naturally, however, the larger the actual point (or "region") of attachment, the more restrictive the attachment will be against rotation. By attaching the breathable material panels 127 at their leading edges 125, the elongation and lateral shrinkage experienced with the netting material 110 during the baling process (which may be as high as about 10%), does not affect the length or width of the breathable material 120.

FIG. 9D also illustrates proximately arranged attachment points 910, but in this embodiment, they are oriented substantially axially, relative to a central axis of the netting material 110. Depending on the specific application, this arrangement may be preferable, as any lone change in width will not affect the breathable material panel 127. Moreover, since elongation (or "stretching") is cumulative, the nearer the attachment points 910 are placed relative to each other, the lower a magnitude of stretching will be that is experienced. This concept also holds true for lateral stretching or contraction when the attachment points 910 are arranged substantially perpendicular relative to a central axis of the netting material 110. As with the embodiment of FIG. 9C, such arrangement of the attachment points provides control over the orientation by restricting longitudinal and lateral slippage and relative rotation of the breathable material panel 127 relative to the netting material 110. FIG. 9D (as well as FIGS. 9N and 9O), illustrates one example alternative shape of the breathable material panel 127. However, still other shapes are possible, and may be selected to achieve various effects.

FIGS. 9E-9G and 9I illustrate attachment points 910 arranged along one edge 925 of the breathable material panel 127. Some internal stiffness of the breathable material panel 127 is necessary to ensure that, as the netting 100 travels into the baler, that the central attachment points 910 sufficiently maintain the leading edge 125 of the breathable material panel 127 substantially proximate to the netting material 110. FIG. 9H illustrates attachment points along two opposite lateral edges 925 of the breathable material panel 127.

FIGS. 9H-9K illustrate attachment regions 911 in the shape of strips arranged along one or more edges of the breathable material panel 127. In the case of the embodiments of FIG. 9H, the attachment regions 911 are arranged on opposite sides of the breathable material panel 127. In the embodiment of FIG. 9I, the attachment region 911 is only along a portion of one lateral edge of the breathable material panel 127. In the embodiment of FIG. 9J, the attachment region 911 is a strip along the leading edge of the breathable material panel 127. In the embodiment of FIG. 9K, the attachment regions 911 are along the leading edge 125 and the opposite trailing edge of the breathable material panel 127.

FIGS. 9L-9N illustrate attachment points 910 arranged substantially in a center of the breathable material panel 127, near a central axis of the breathable material 110. As with the above embodiments, if the attachment points 910 are sufficiently close to one another, any movement due to elongation will not substantially affect the breathable material panel 127. In this embodiment, some internal stiffness of the breathable material panel 127 is necessary to ensure that, as the netting 100 travels into the baler, that the central attachment points 910 sufficiently maintain the leading edge 125 of the breathable material panel 127 substantially proximate to the netting material 110, so that it is wrapped around the bale in the proper orientation, and is not caught by a component of the baler and prevented from properly being wound around a bale (or other item).

The embodiment of FIG. 9O illustrates a breathable material panel 127 having an oval shape, and attachment points 910 arranged substantially along the contour of the leading edge of the breathable material panel 127.

Of course, in all of the embodiments of FIG. 9, the attachment points 910 need not necessarily be "points" or "dots" as illustrated, but may be in any form, and of any size suitable for providing adequate attachment strength and material characteristics of the composite netting material.

The breathable material 120 may be attached to the netting material 110 in any of a variety of manners, such as by fusing through ultrasonic welding, heat welding or solvent welding, by adhesives such as adhesive tape, hot melt or by other types of adhesives or connectors. Alternatively, or additionally if desired, attachment elements may be used, such as hooks, wires, including twist ties and wire rings, strings, elastic elements, including elastic strings, straps of plastic, paper ties or another material. Additionally, attachment means may include knitting processes. Since it is only necessary for the attachment elements to hold the breathable material panels 127 to the netting material 110 during the wrapping process, if the attachment elements are made from a relatively easily degradable material such as paper, no detrimental effects would be realized. This is because by the time rain or other climate conditions would affect the degradable material, the breathable material would already be bound by the netting material 110 on the bale.

It should be noted that it is not essential that every breathable material panel 127 be attached to the netting material by the same means. While typically such an arrangement would be easiest to manufacture, there are no functional reasons for not using different attachment modes for different breathable material panels 127. It should also be noted that a single breathable material panel 127 may, if desired, be attached to the netting material 110 by multiple modes (e.g. by an elastic string and fused portions).

In certain embodiments, the breathable material 120 extends only the width of the bale, while the netting material 110 extends beyond the width of the bale, in order to facilitate covering the edge of the bale, which is doubly advantageous when the outermost layer of netting material 110 is split and wraps around the edge of the bale. In embodiments where the netting material 110 is dimensioned to extend over the edges of the bale, this allows the net 100 to grip rough edges of a baled crop and thereby reduce the chances for unraveling of the net 100 that might otherwise more easily occur.

In some embodiments, the breathable material 120 can be wide enough to cover all or a portion of the sides of the bale, in addition to the circumference of the bale to fold over the edges and additionally protect the bale from exposure to moisture.

Each bale is initially wrapped with about one full wrapping of the netting material 110, corresponding to the first wrapping section 141. The length of the first wrapping portion is therefore substantially equal to the circumference of the bale, though variations from this length are possible to produce the desired result. Use of less netting could be desirable in instances where cost savings are an issue. Alternatively, a desire for increased strength is a main reason for use of more net. However, in other embodiments, more or less netting 110 may be applied to the bale to increase the strength of the wrapping, or for other desired effects. Since the netting 110 is largely an open mesh, additional layers do not substantially impede the function of the breathable material 120.

Next, in continuum, the second wrapping section 143, with its breathable material panel 127, partially attached to a respective portion of the netting material of the second wrapping section 143, is then wrapped around the bale with its adjacent netting section. After completion of this step, the result is that approximately two netting layers and one breathable material layer surround the bale. If the breathable material panel 127 has been attached to the underside of its adjacent netting portion, (relative to being wound on the bale), then the order of layers, relative to the surface of the bale, is: net-breathable material-net. If the breathable material panel 127 has been attached to the top side of its adjacent netting portion, (relative to being wound on the bale), then the order of layers, relative to the surface of the bale, is: net-net-breathable material. It should be understood that the aforementioned example combinations of netting and breathable material layers are not intended to be exhaustive or limiting, but are to serve as example arrangements.

Following the application of a second wrapping section, the third wrapping section 145, in continuum, is wrapped around the bale. The third wrapping section 145 consists essentially of netting, and thus may surround the bale as many times as desired to secure the bale. However, in many instances, it is not necessary to wrap the bale fully to achieve a secure bale.

A fourth or further additional layer of netting may be applied to the bale, if desired, to achieve increased strength or for other objectives.

As an optional step, the outermost netting layers 110 are slit substantially along a center line of the bale, causing these portions of the netting material to spread over and cover the edges of the bale. Since the netting is somewhat stretched during the baling process in order to provide the required tension for holding the bale together, the netting on the bale includes internal tension from the stretching that occurs. When the netting is split along a centerline, the internal forces within the netting cause the netting to shift and cover each of the edges of the bale. Naturally the extent to which this occurs depends on the specific type of netting 110 used. This method is particularly applicable to use of Raschel knitted netting.

Figure 3A:
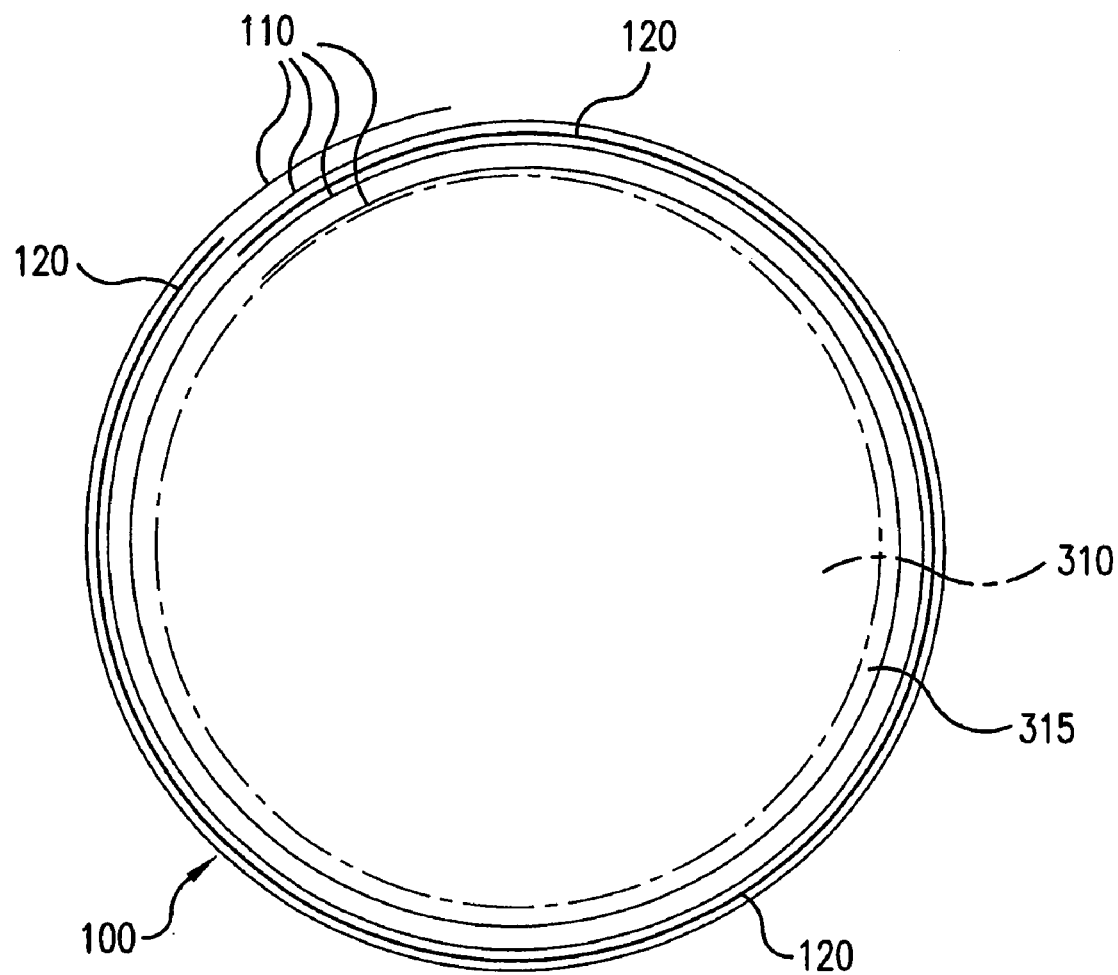
FIGS. 3a and 3b are end views of a bale wrapped with the first embodiment of the composite netting material.
Figure 3B:
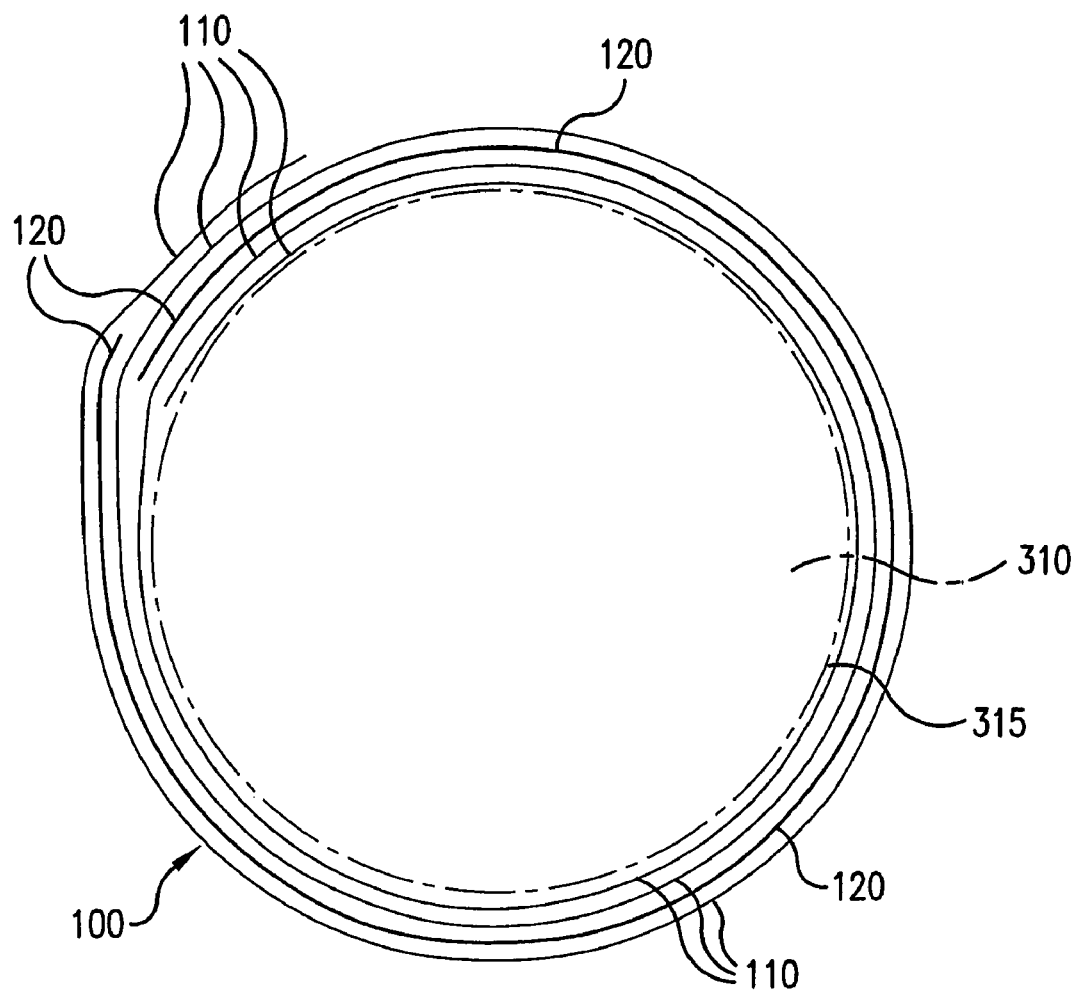

FIGS. 3a and 3b illustrate a cross-section of a wrapped bale in accordance with the invention. As seen in this Figure, if the breathable material 120 is mounted on a face of the netting material 110 that is placed against the bale 310, what is essentially a first layer of netting will contact the bale 310 at a first level. This netting corresponds to the first wrapping segment 141, and may comprise slightly more or less than one complete circumference of wrapping, as desired. Above this layer is a breathable material from the second wrapping section 143, and, above that is the netting material 110 of the same second wrapping section 143, which is partially attached to the breathable material 120.

As illustrated in FIGS. 3a and 3b, the breathable material surrounds the bale only one time, though a slight overlap is allowable. However, as stated above, if the properties of a chosen breathable material are such that more than one layer does not detrimentally affect the function of the breathable material, then more than one layer may be utilized.

Figure 4:
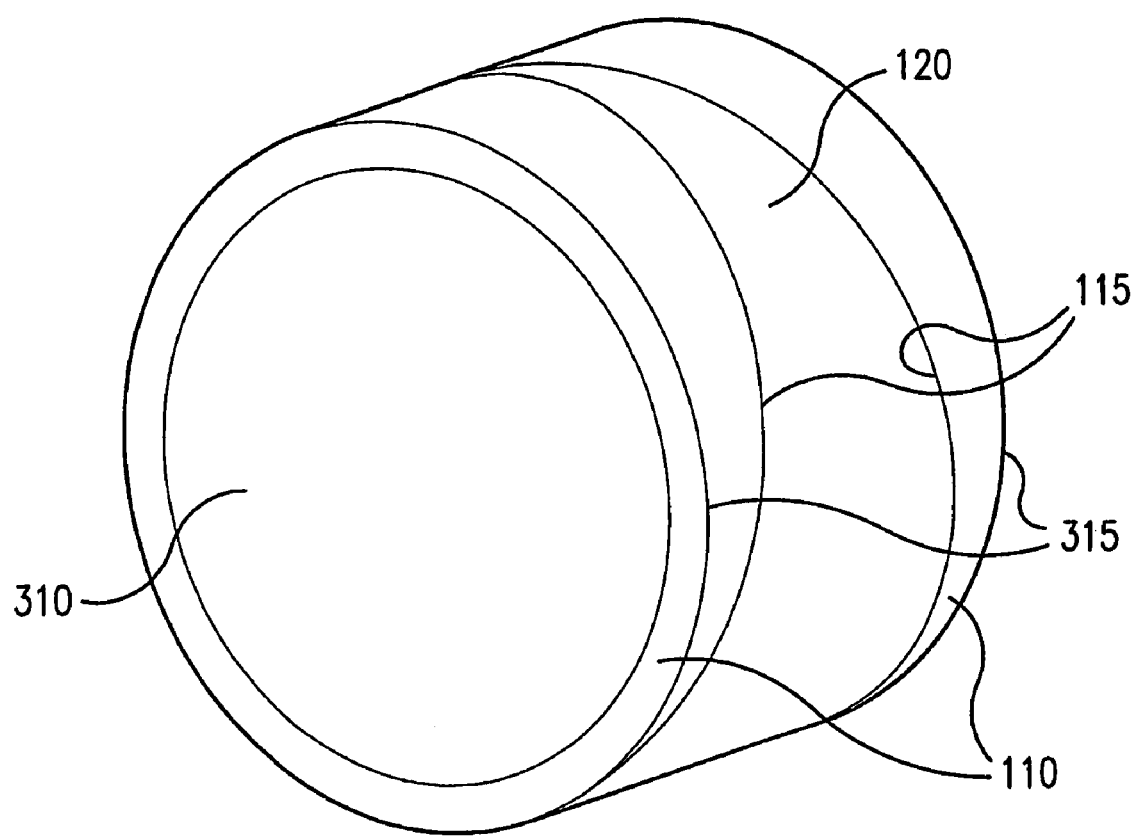
FIG. 4 is an isometric view of a bale wrapped with netting material according to the first embodiment, in which the outermost layers of netting material have been split.
Figure 5A:
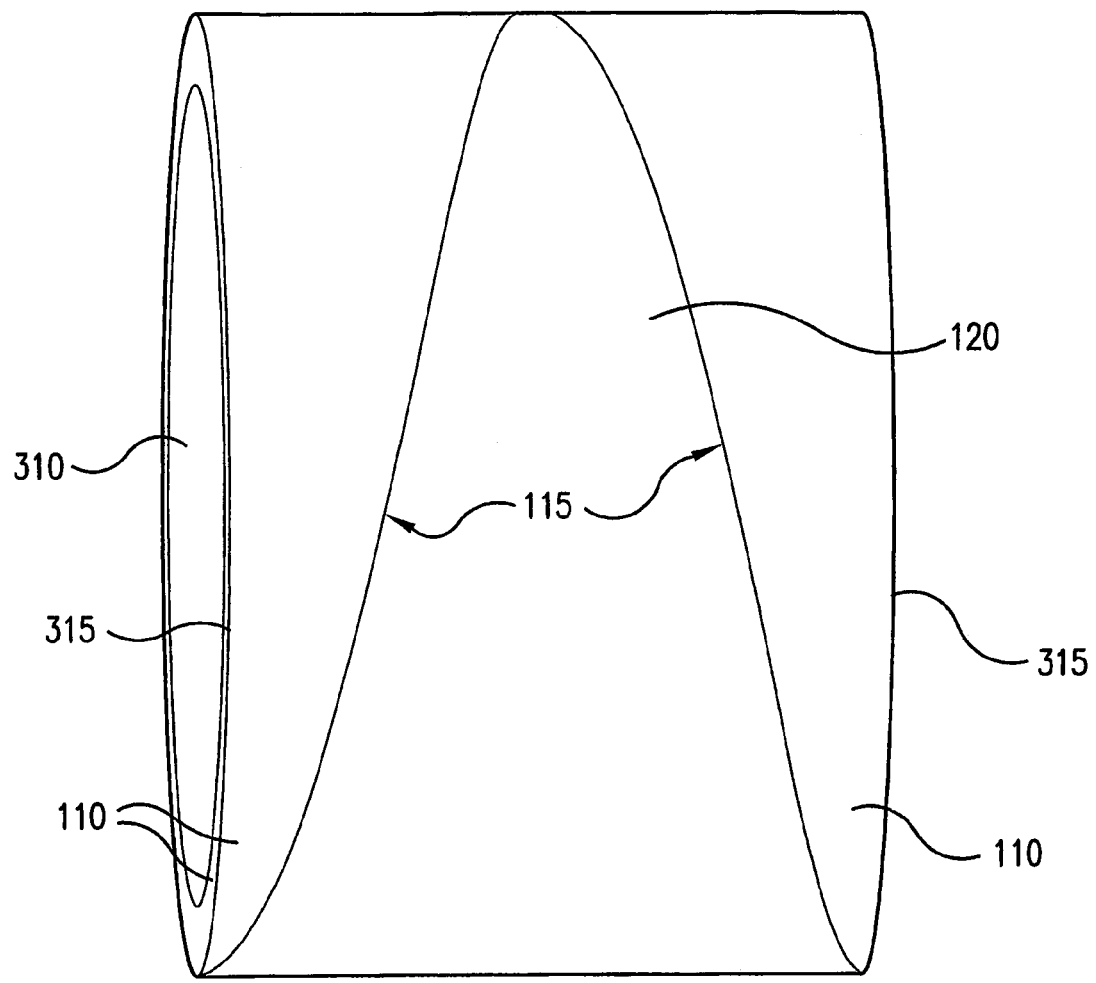
FIGS. 5a and 5b are isometric and front views, respectively, of a bale wrapped with netting material according to the first embodiment, in which the outermost layers of netting material have been split.
Figure 5B:
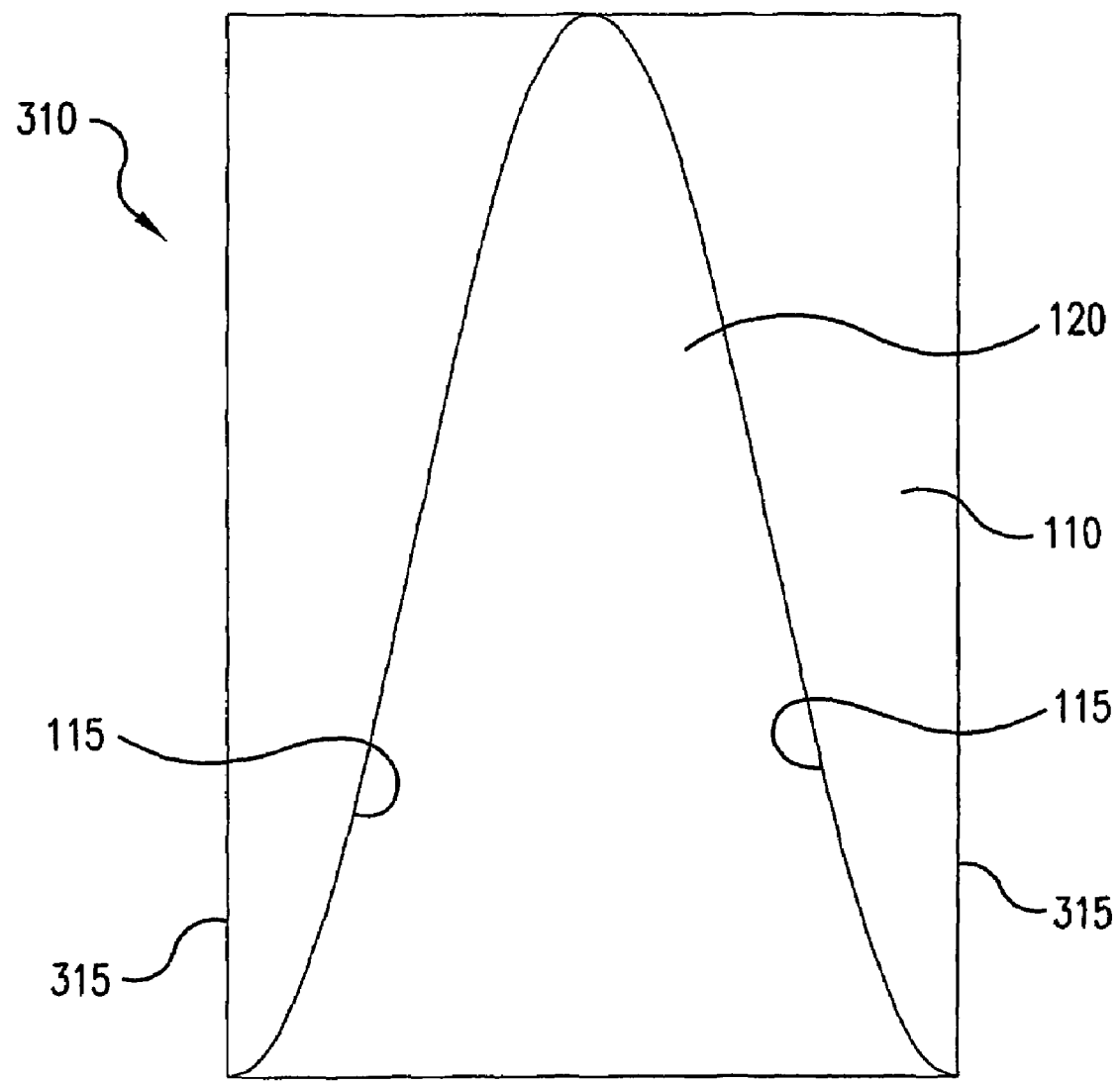

FIGS. 4 and 5a are isometric views and FIG. 5b is a front view, illustrating a bale 310 wrapped in the subject composite netting material 100, following a step where the outermost layer of netting 110 is split.

When slit approximately along a centerline about the circumference of the bale 310, the netting contracts, and the cut edges 115 move toward the edges 315 of the bale 310. The breathable material 120 is not cut, and remains to protect the baled crop from excess moisture. Since the outer layers of netting 110 still remain partially on the circumference of the bale, the netting 100 still helps hold the bale together, and hold the breathable material 120 to the bale 310.

With the netting 110 covering the edges 315 of the bale 310, the netting 110 further grips the edges 315 of the bale 310. In part, the netting 110 engages the rough surface of the bale 310, becoming partially entangled in the baled crop itself. Thus, the edges of the bale 315 are additionally held in by the netting 110, and the netting 110 is additionally prevented from undesirably unraveling.

As an alternative to splitting the entire outer layer of netting 110, it may be desirable to only slit a portion of the outer layer of netting 110, that is, along a portion of the circumference of the bale 310.

FIGS. 6, 7a, 7b and 8 illustrate example alternate embodiments of arrangements of breathable material 120 on a continuous netting material 110. As with the embodiment of FIGS. 1 and 2, the breathable material panels 120 are attached to the netting portion. Partial attachment along a leading edge is preferable for the mode of attachment. However, particularly in the embodiments illustrated in FIGS. 6 and 8, elongation of the netting material 110 during baling, which will result in a lateral shrinkage, will less adversely affect this arrangement of breathable material panels.

Figure 6:
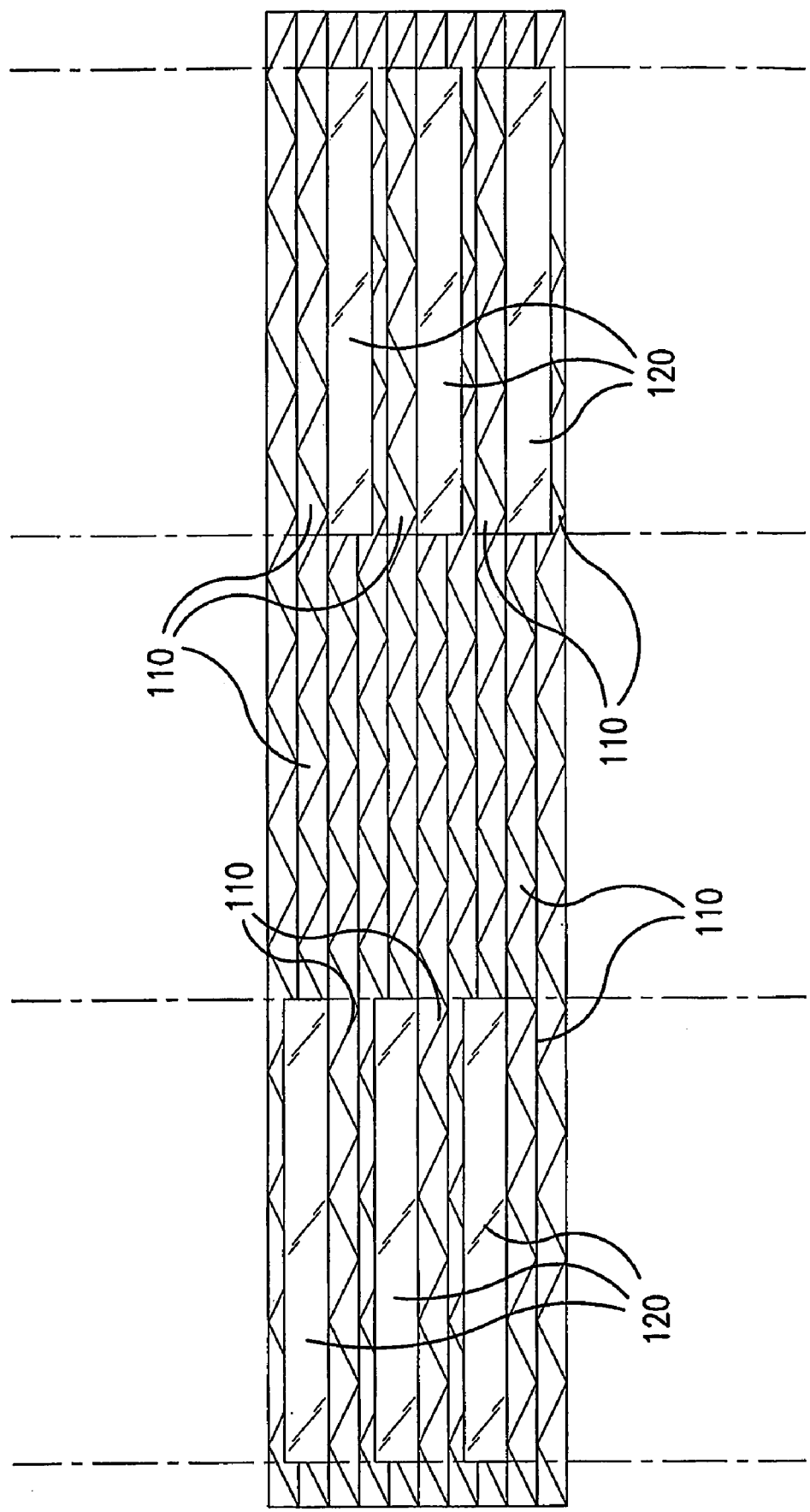
FIG. 6 is a top view of a second embodiment of a composite netting material according to the present invention.
Figure 8:
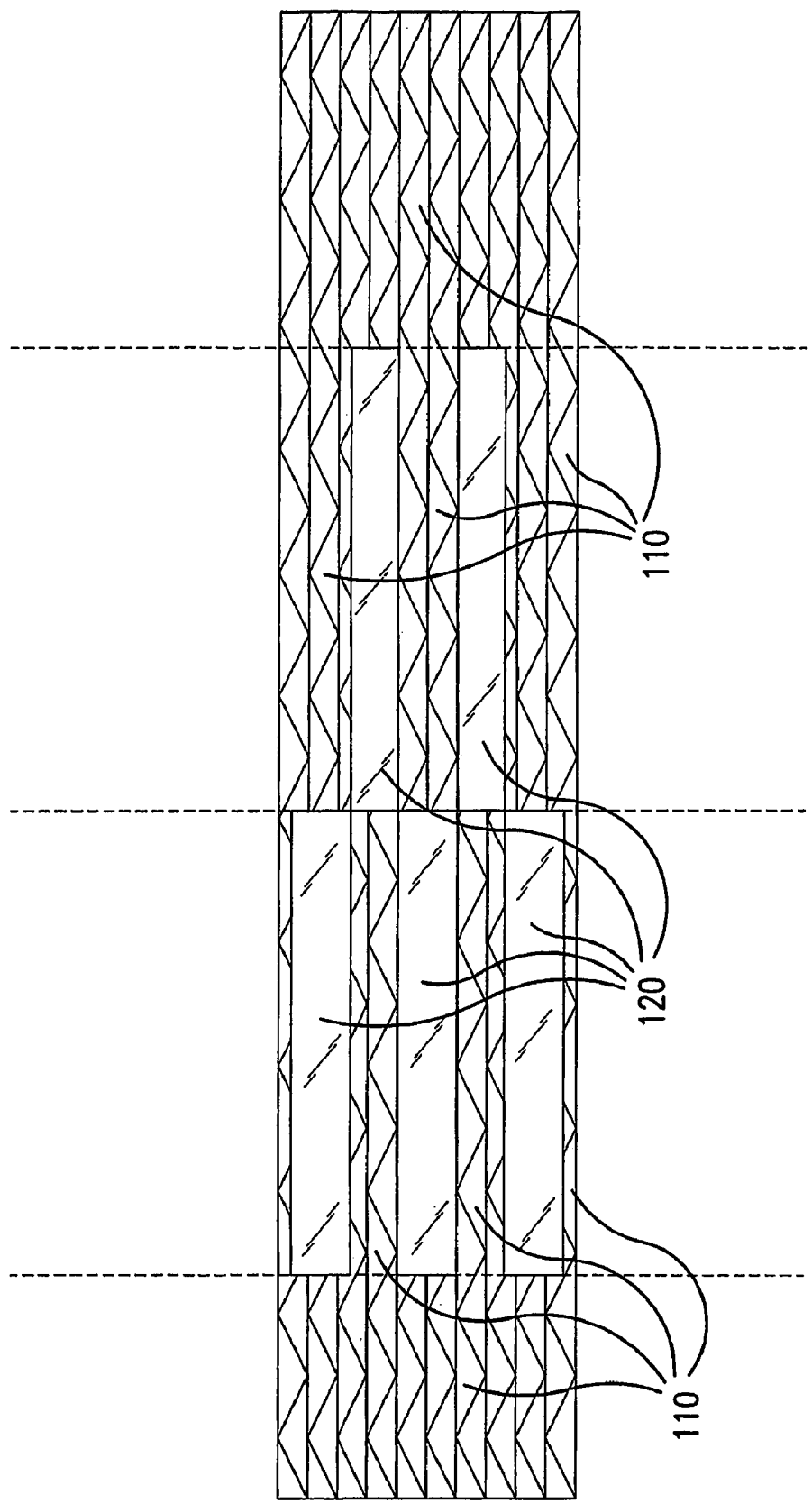
FIG. 8 is a top view of a fifth embodiment of a composite netting material according to the present invention.

In the embodiment of FIGS. 6 and 8, the breathable material panels 120 are arranged in relatively narrow strips along a width of the netting material 110. Thus, when wrapping a bale, it will appear to be striped. The bale may be left with such a covering if only partial protection from the elements is desired. However, a complete covering is achieved in these embodiments when two layers of breathable material are covering the bale. These layers, however, only slightly overlap each other since the breathable material 120 is arranged in panels that are offset from one another, only overlapping slightly, if at all.

The embodiments of FIGS. 6 and 8 differ in the placement of overlapping sections of breathable material 120 panels. Where the embodiment of FIG. 6 includes a section of netting material 110 between sections of breathable material 120 panels, the embodiment of FIG. 8 includes two offset sections of breathable material 120 panels arranged adjacently to one another on the continuous netting material 110.

Figure 7A:
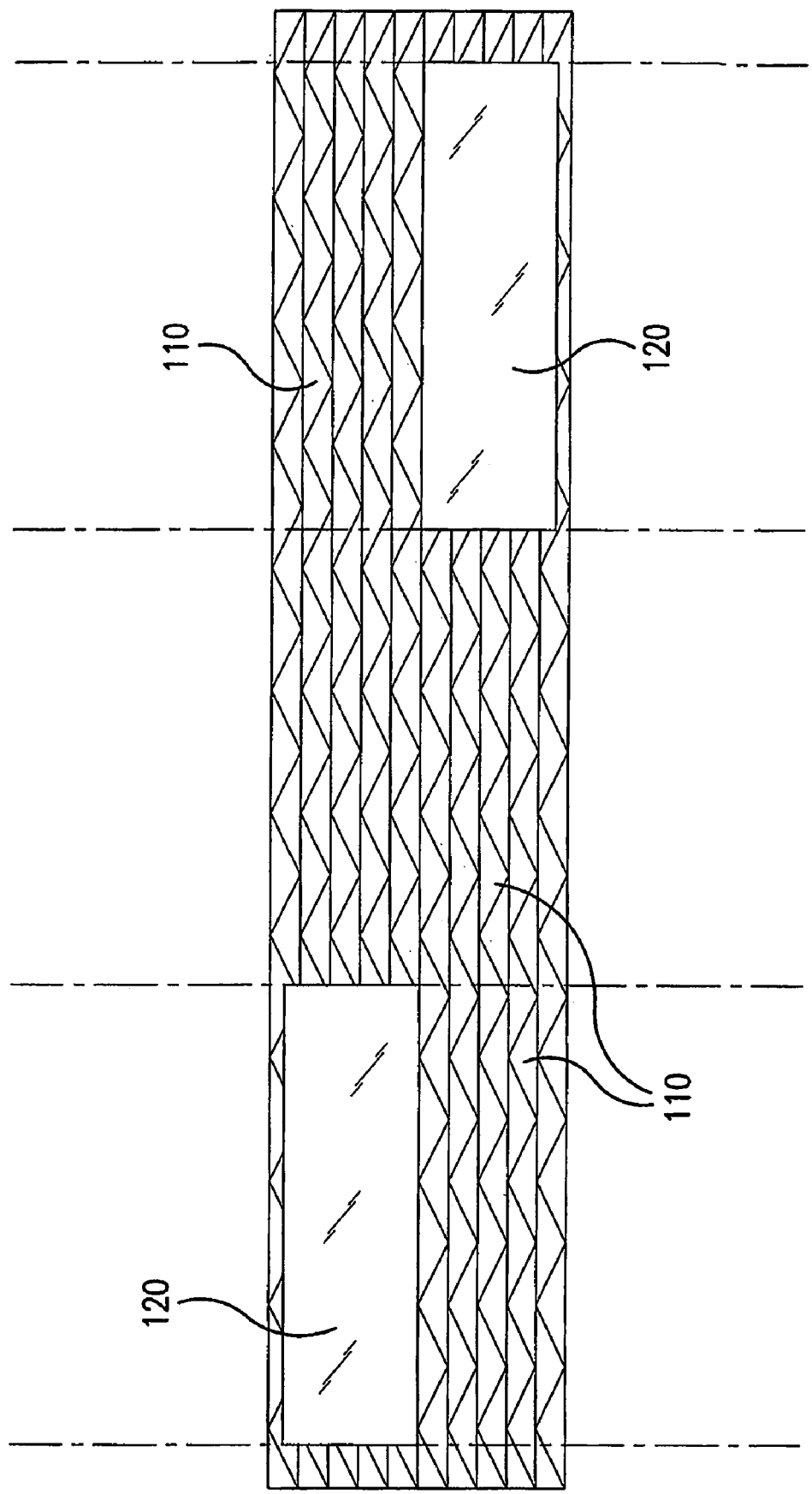
FIGS. 7a and 7b are top views of third and fourth embodiments of a composite netting material according to the present invention.
Figure 7B:
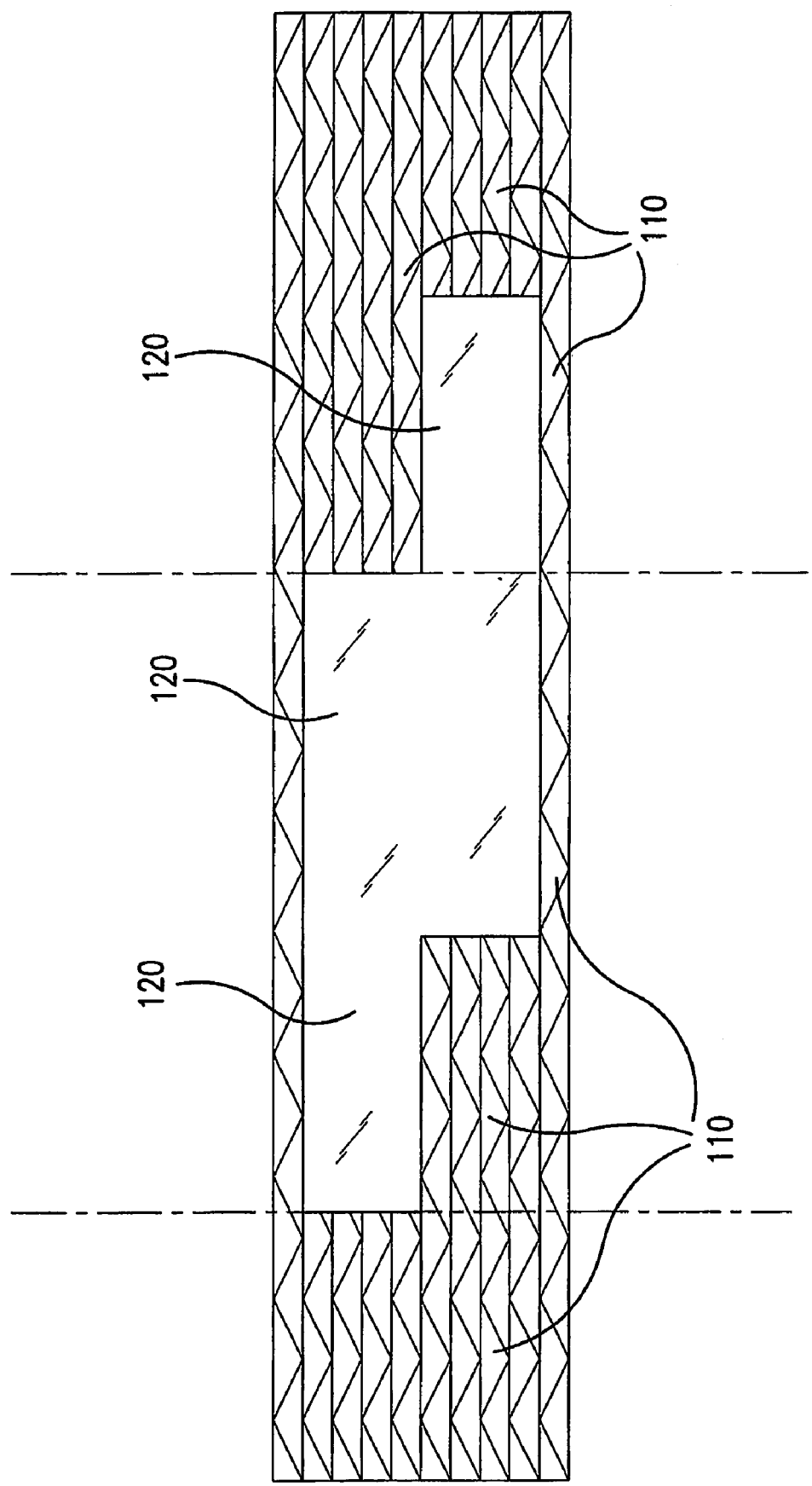

FIGS. 7a and 7b are variations of FIGS. 6 and 8, in which larger panels of breathable material 120 are used. In FIG. 7a, the breathable material 120 panels are set apart from each other, covering the entire width of the bale in combination when both are wrapped around the bale. In FIG. 7b, the breathable materials are contiguous along their edges, but offset slightly so that one portion begins and ends before the other, relative to feeding into a baler.

Of course, in each of these embodiments, more than one wrapping of breathable material is necessary to achieve maximum protection from moisture, since each wrapping of breathable material 120 only covers approximately half of the surface area of the circumference of the bale.

It is to be understood that though the above examples describe the subject netting material for use in wrapping bales of agricultural produce, the invention may advantageously be applied to wrapping other spoilable items. The subject netting material, for example, can be used to wrap spoilable items such as fruits, vegetables or plants that are on pallets, in preparation for shipping. Additionally, substantially rectangular bales, as well as substantially cylindrical bales can advantageously be covered with the subject composite netting material.

It is to be understood that not specifically set forth in this disclosure, that alternate embodiments and combinations of the inventive components disclosed herein are possible, and that the spirit of the invention may be practiced in a variety of ways.

The invention claimed is:

1. A composite netting comprising:
a continuous netting having a multiplicity of openings which are liquid and vapor permeable, the continuous netting consisting of a plurality of adjacent portions of approximately equal dimensions, each of said portions being partially overlaid by a breathable material panel of dimensions smaller than the corresponding dimensions of said portion, the breathable material panels each being only partially attached to the continuous netting, the breathable material panels being substantially permeable to water vapor and substantially impermeable to liquid water.

2. A composite netting comprising:
a continuous netting having a multiplicity of openings that are liquid and vapor permeable; and
a plurality of breathable material panels periodically overlaying said continuous netting over its length such that said continuous netting extends along its length beyond the limits of each of said breathable material panels and extends along its width at least substantially to the limit of each of said breathable material panels, the breathable material panels each being partially attached to the continuous netting at preselected intervals along the length of the netting leaving exposed netting between the breathable material panels, the breathable material panels being substantially vapor permeable and liquid impermeable, the partial attachment of the breathable material panels to the continuous netting being such that at least one preselected part of each of the plurality of breathable material panels is physically attached to at least one preselected part of the netting.

3. The composite netting of claim 2, wherein the remainder of each breathable material panel is not attached to the netting so that when the continuous netting is stretched lengthwise, the breathable material panels are not correspondingly stretched lengthwise.

4. The composite netting of claim 2, wherein the continuous netting is substantially rectangular.

5. The composite netting of claim 2, wherein each of the plurality of breathable material panels is substantially rectangular, and has a preselected panel length and width, the panel width being selected to be substantially equal to a width of a spoilable item to be wrapped, and the panel length being selected to be substantially equal to the circumference of the spoilable item to be wrapped.

6. The composite netting of claim 2, wherein the preselected intervals are selected to be equal to about 2.5 times a circumference of a spoilable item to be wrapped.

7. The composite netting of claim 2, wherein the breathable material panel has a leading edge and a trailing edge and each breathable material panel is attached to the netting along the leading edge of the breathable material panel.

8. The composite netting of claim 7, wherein the leading edge of each breathable material panel is separated from the trailing edge of another breathable material panel by a preselected distance.

9. The composite netting of claim 7, wherein the preselected distance is selected to be at least about 1.5 times the circumference of a spoilable item to be wrapped.

10. The composite netting of claim 4, wherein the preselected panel length being greater than the circumference of the spoilable item to be wrapped so that, when a spoilable item is wrapped, the breathable panel forms at least one layer of breathable material around the circumference of the spoilable item and an additional layer of breathable material at least partially around the circumference of the spoilable item.

11. A round bale wrapped about its circumference with the netting of claim 2.

12. The round bale of claim 11, wherein at least a portion of the continuous netting includes a cut along a centerline of the netting, the cut having a length that is substantially equal to the circumference of the bale.

13. The round bale of claim 11, wherein the round bale includes agricultural produce.

14. The composite netting of claim 2, wherein the continuous netting includes a first section, a second section, and a third section between the first and second sections, the third section includes the attachment to the breathable material panels, and the first and second sections each having a length greater than the circumference of an item to be wrapped.

15. A composite netting comprising:
a continuous netting having a multiplicity of openings which are liquid and vapor permeable;
a plurality of breathable material panels overlaying and partially attached to the continuous netting at preselected intervals along the length of the netting such that a portion of the continuous netting is exposed between each of the partially attached plurality of breathable material panels, the breathable material panels being substantially permeable to water vapor and substantially impermeable to liquid water.

16. The composite netting of claim 15, wherein the partial attachment of the breathable material panels to the continuous netting is such that when the continuous netting is stretched, the breathable material panels do not stretch or vice versa.

17. A round bale wrapped about its circumference with the netting of claim 15.

18. The round bale of claim 17, wherein at least a portion of the continuous netting includes a cut along a centerline of the netting, the cut having a length that is substantially the circumference of the bale.

19. The round bale of claim 17, wherein the round bale includes agricultural produce.

20. The composite netting of claim 15, wherein the breathable material panels do not stretch lengthwise when the continuous netting stretches lengthwise.

21. The composite netting of claim 2, wherein each of the plurality of breathable material panels has a length greater than the circumference of a bale of a spoilable item.

22. The composite netting of claim 2, further comprising indicators permitting the bale to be seen from a distance.

23. The composite netting of claim 2, wherein said preselected part of each of the plurality of breathable material panels is physically attached to said at least one preselected part of the netting at a leading edge of said breathable materials panels.

24. The composite netting of claim 23, wherein said attachment along said leading edge is discontinuous.

25. The composite netting of claim 2, wherein said attachment is achieved via welding, adhesives, or attachment elements.

* * * * *